(12) United States Patent
Baskaran et al.

(10) Patent No.: US 10,564,949 B2
(45) Date of Patent: Feb. 18, 2020

(54) SYSTEM AND METHOD FOR GENERATION OF EVENT DRIVEN, TUPLE-SPACE BASED PROGRAMS

(71) Applicant: Reservoir Labs, Inc., New York, NY (US)

(72) Inventors: Muthu M. Baskaran, Bayonne, NJ (US); Thomas Henretty, Brooklyn, NY (US); M. H. Langston, New Windsor, NY (US); Richard A. Lethin, New York, NY (US); Benoit J. Meister, New York, NY (US); Nicolas T. Vasilache, New York, NY (US); David E. Wohlford, Portland, OR (US)

(73) Assignee: Reservoir Labs, Inc., New York, NY (US)

( * ) Notice: Subject to any disclaimer, the term of this patent is extended or adjusted under 35 U.S.C. 154(b) by 0 days.

(21) Appl. No.: 14/492,899

(22) Filed: Sep. 22, 2014

(65) Prior Publication Data
US 2015/0089485 A1    Mar. 26, 2015

Related U.S. Application Data

(60) Provisional application No. 61/880,592, filed on Sep. 20, 2013.

(51) Int. Cl.
*G06F 8/41* (2018.01)

(52) U.S. Cl.
CPC ................................. *G06F 8/452* (2013.01)

(58) Field of Classification Search
CPC ........ G06F 8/452; G06F 9/4881; G06F 8/433; G06F 2209/5017; G06F 2209/483

USPC .......................................................... 717/160
See application file for complete search history.

(56) References Cited

U.S. PATENT DOCUMENTS

| | | | | |
|---|---|---|---|---|
| 5,287,498 A | * | 2/1994 | Perelman | H04M 3/53325 |
| 5,517,656 A | * | 5/1996 | Shi | H04L 12/43 |
| | | | | 712/20 |
| 7,051,029 B1 | * | 5/2006 | Fayyad | G06F 17/30876 |
| 7,089,556 B2 | * | 8/2006 | Fong | G06F 9/5038 |
| | | | | 703/2 |
| 2005/0240896 A1 | * | 10/2005 | Wu | G06F 9/45525 |
| | | | | 717/100 |
| 2007/0168999 A1 | * | 7/2007 | Haber | G06F 11/3466 |
| | | | | 717/130 |

(Continued)

OTHER PUBLICATIONS

V. Bandishti, I. Pananilath, and U. Bondhugula. Tiling stencil computations to maximize parallelism. In SC, p. 40, 2012.

(Continued)

*Primary Examiner* — Emerson C Puente
*Assistant Examiner* — Sen Thong Chen
(74) *Attorney, Agent, or Firm* — Goodwin Procter LLP

(57) ABSTRACT

In a system for automatic generation of event-driven, tuple-space based programs from a sequential specification, a hierarchical mapping solution can target different runtimes relying on event-driven tasks (EDTs). The solution uses loop types to encode short, transitive relations among EDTs that can be evaluated efficiently at runtime. Specifically, permutable loops translate immediately into conservative point-to-point synchronizations of distance one. A runtime-agnostic which can be used to target the transformed code to different runtimes.

47 Claims, 11 Drawing Sheets

(56) References Cited

U.S. PATENT DOCUMENTS

| | | | |
|---|---|---|---|
| 2010/0218196 A1* | 8/2010 | Leung | G06F 8/453 718/107 |
| 2011/0047144 A1* | 2/2011 | Han | G06F 17/30445 707/718 |
| 2011/0153575 A1* | 6/2011 | Glasser | G06F 11/3684 707/690 |
| 2011/0161643 A1* | 6/2011 | Eichenberger | G06F 9/3887 712/241 |
| 2011/0276968 A1* | 11/2011 | Kand | G06F 9/5038 718/102 |
| 2012/0089595 A1* | 4/2012 | Jaecksch | G06F 17/30463 707/714 |
| 2012/0110583 A1* | 5/2012 | Balko | G06F 9/4843 718/102 |
| 2012/0124127 A1* | 5/2012 | McGrady | H04L 65/00 709/203 |
| 2012/0144376 A1* | 6/2012 | Van Eijndhoven | G06F 8/456 717/146 |
| 2012/0179924 A1* | 7/2012 | Sugiyama | G06F 1/3206 713/320 |
| 2012/0254875 A1* | 10/2012 | Marathe | G06F 8/72 718/102 |
| 2013/0060556 A1* | 3/2013 | Gao | G06F 17/5045 703/21 |
| 2013/0094580 A1* | 4/2013 | Zhou | H04N 19/13 375/240.12 |
| 2014/0101640 A1* | 4/2014 | Romdhane | G06F 11/3684 717/125 |
| 2015/0187322 A1* | 7/2015 | Munshi | G06F 9/5044 345/541 |
| 2015/0268992 A1* | 9/2015 | Fan | G06F 9/4881 718/106 |

OTHER PUBLICATIONS

M. M. Baskaran, N. Vydyanathan, U. Bondhugula, J. Ramanujam, A. Rountev, and P. Sadayappan. Compiler-assisted dynamic scheduling for effective parallelization of loop nests on multicore processors. In D. A. Reed and V. Sarkar, editors, PPOPP, pp. 219-228. ACM, 2009. ISBN 978-1-60558-397-6.

C. Bastoul. Code generation in the polyhedral model is easier than you think. In PACT'04, pp. 7-16, Juan-les-Pins, Sep. 2004.

R. D. Blumofe, C. F. Joerg, B. C. Kuszmaul, C. E. Leiserson, K. H. Randall, and Y. Zhou. Cilk: An efficient multithreaded runtime system. J. Parallel Distrib. Comput., 37(1):55-69, 1996.

O. A. R. Board. The openmp specification for parallel programming http://www.openmp.org, 2008.

U. Bondhugula, A. Hartono, J. Ramanujan, and P. Sadayappan. A practical automatic polyhedral parallelizer and locality optimizer. In ACM SIGPLAN Programming Languages Design and Implementation (PLDI '08), Tucson, Arizona, Jun. 2008.

Z. Budimlic, M. G. Burke, V. Cav'e, K. Knobe, G. Lowney, R. Newton, J. Palsberg, D. M. Peixotto, V. Sarkar, F. Schlimbach, and S. Tasirlar. Concurrent collections. Scientific Programming, 18(3-4):203-217, 2010.

N. Carter. et al. Runnemede: An architecture for ubiquitous high performance computing. In Proceedings of the 2013 IEEE 19th International Symposium on High Performance Computer Architecture (HPCA), HPCA '13, pp. 198-209, Washington, DC, USA, 2013. IEEE Computer Society. ISBN 978-1-4673-5585-8.

J. F. Collard, D. Barthou, and P. Feautrier. Fuzzy array dataflow analysis. In Proceedings of the 5th ACM SIGPLAN Symposium on Principles and Practice of Parallel Programming, pp. 92-101, Santa Barbara, California, Jul. 1995. URL citeseer.ist.psu.edu/article/collard95fuzzy.html.

H. Esmaeilzadeh, E. Blem, R. St. Amant, K. Sankaralingam, and D. Burger. Dark silicon and the end of multicore scaling. SIGARCH Comput. Archit. News, 39(3):365-376, Jun. 2011. ISSN 0163-5964.

P. Feautrier. Parametric integer programming. RAIRORechercheop'erationnelle, 22(3):243-268, 1988. URL citeseer.ist.psu.edu/feautrier88parametric.html.

P. Feautrier. Dataflow analysis of array and scalar references. International Journal of Parallel Programming, 20(1):23-52, Feb. 1991. URL citeseer.ist.psu.edu/feautrier91dataflow.html.

P. Feautrier. Some efficient solutions to the affine scheduling problem. Part I. One-dimensional time. International Journal of Parallel Programming, 21(5):313-348, Oct. 1992. URL citeseer.ist.psu.edu/feautrier92some.html.

S. Girbal, N. Vasilache, C. Bastoul, A. Cohen, D. Parello, M. Sigler, and O. Temam. Semi-automatic composition of loop transformations for deep parallelism and memory hierarchies. Int. J. Parallel Program., 34(3):261-317, Jun. 2006. ISSN 0885-7458.

A. Haidar, H. Ltaief, A. YarKhan, and J. Dongarra. Analysis of dynamically scheduled tile algorithms for dense linear algebra on multicore architectures. Concurrency and Computation: Practice and Experience, 24(3):305-321, 2011.

F. Irigoin and R. Triolet. Supernode partitioning. In Proceedings of the 15th ACM SIGPLAN-SIGACT Symposium on Principles of programming languages, pp. 319-329, New York, NY, USA, Jan. 1988. ACM Press. ISBN 0-89791-252-7.

A. Jimborean, P. Clauss, B. Pradelle, L. Mastrangelo, and V. Loechner. Adapting the polyhedral model as a framework for efficient speculative parallelization. In PPOPP, pp. 295-296, 2012.

P. M. Kogge, S. Borkar, W.W. Carlson, W. J. Dally, M. Denneau, P. D. Franzon, S. W. Keckler, D. Klein, R. F. Lucas, S. Scott, A. E. Snavely, T. L. Sterling, R. S.Williams, K. A. Yelick,W. Harrod, D. P. Campbell, K. L. Hill, J. C. Hiller, S. Karp,M. A. R.s, and A. J. Scarpelli. Exascale Study Group: Technology Challenges in Achieving Exascale Systems. Technical report, DARPA, 2008.

C. E. Oancea and L. Rauchwerger. Logical inference techniques for loop parallelization. In Proceedings of the 33rd ACM SIGPLAN conference on Programming Language Design and Implementation, PLDI '12, pp. 509-520, New York, NY, USA, 2012. ACM. ISBN 978-1-4503-1205-9.

D. o. M. P. S. Pacheco. A User's Guide to MPI, Mar. 1998. URL ftp://math.usfca.edu/pub/MPI/mpi.guide.ps.

L. Rauchwerger, F. Arzu, and K. Ouchi. Standard templates adaptive parallel library (stapl). In LCR, pp. 402-409, 1998.

J. Reinders. Intel threading building blocks—outfitting C++ for multicore processor parallelism. O'Reilly, 2007. ISBN 978-0-596-51480-8.

A. Tabbal, M. Anderson, M. Brodowicz, H. Kaiser, and T. L. Sterling. Preliminary design examination of the parallex system from a software and hardware perspective. SIGMETRICS Performance Evaluation Review, 38(4):81-87, 2011.

S. Verdoolaege. isl: An integer set library for the polyhedral model. In ICMS, pp. 299-302, 2010.

K. B. Wheeler, R. C. Murphy, and D. Thain. Qthreads: An API for programming with millions of lightweight threads. In IPDPS, pp. 1-8. IEEE, 2008.

* cited by examiner

1. Mark the root node of the tree
2: repeat
3:     Let N the next node in the BFS traversal
4:     if N is at tile granularity or
5:         N is user-provided then mark N
6:     else if N is sequential then mark N
7:     else if N is has siblings then mark N
8:     else if N is permutable and
9:         N is in a different band than parent(N) and
10:        parent(N) is not marked
11:    then
12:        mark N
13:    end if
14: until tree traversed;

FIG. 2

```
// Pseudo-code to spawn tasks asynchronously
for (i=⌈$\frac{-N-15}{16}$⌉;i<=⌊$\frac{T-3}{16}$⌋;i++) {
 for (j=max(i,-i-1);
      j<=min(⌊$\frac{-8*i+T-2}{8}$⌋,⌊$\frac{8*i+N+7}{8}$⌋,⌊$\frac{T+N-2}{16}$⌋);j++) {
  for (k=max(0,⌈$\frac{i+j-1}{2}$⌉,⌈$\frac{16*j-N-14}{16}$⌉);
       k<=min(⌊$\frac{T+N-2}{16}$⌋,⌊$\frac{16*j+N+14}{16}$⌋,⌊$\frac{8*i+8*j+N+15}{16}$⌋);k++) {
   spawn_task_async(tag(i, j, k));

// Input: tag t
int i=t.i, j=t.j, k=t.k;
// Use enclosing loops' upper and lower bounds to
// determine whether the task sits on a boundary
bool interior_1 =
   ((i-1 >= ⌈$\frac{-N-15}{16}$⌉) && (i-1 <= ⌊$\frac{T-3}{16}$⌋))                              &&
   ((j >= (i-1,-i)))                                                                           &&
   (j <= min(⌊$\frac{-8*(i-1)+T-2}{8}$⌋,⌊$\frac{8*(i-1)+N+7}{8}$⌋),⌊$\frac{T+N-2}{16}$⌋))      &&
   ((k >= max(0,⌈$\frac{(i-1)+j-1}{2}$⌉,⌈$\frac{16*j-N-14}{16}$⌉))                             &&
   (k <= min(⌊$\frac{T+N-2}{16}$⌋,⌊$\frac{16*j+N+14}{16}$⌋,⌊$\frac{8*(i-1)+8*j+N+15}{16}$⌋)));
if (interior_1) wait_task(tag(i-1, j, k));   // a.k.a get
//    EDT body
signal_task_finished(tag(i, j, k));          // a.k.a put
```

FIG. 3

```
for (t=1; t<T; t++) {
  doall (i=1; i<N-1; i++) {
    for (j=1; j<N-1; j++) {
      doall (k=1; k<N-1; k++) {
        A[t][i][j][k] = f(A);
}}}}
```

FIG. 4

⟨linear-expr⟩ ::= ⟨number⟩
  | ⟨induction-term⟩
  | ⟨parameter⟩
  | ⟨number⟩ '*' ⟨linear-expr⟩
  | ⟨linear-expr⟩ '+' ⟨linear-expr⟩
  | ⟨linear-expr⟩ '-' ⟨linear-expr⟩

⟨expr⟩ ::= ⟨linear-expr⟩
  | 'MIN(' ⟨expr⟩ ',' ⟨expr⟩ ')'
  | 'MAX(' ⟨expr⟩ ',' ⟨expr⟩ ')'
  | 'CEIL(' ⟨linear-expr⟩ ',' ⟨number⟩ ')'
  | 'FLOOR(' ⟨linear-expr⟩ ',' ⟨number⟩ ')'
  | 'SHIFTL(' ⟨linear-expr⟩ ',' ⟨number⟩ ')'
  | 'SHIFTR(' ⟨linear-expr⟩ ',' ⟨number⟩ ')'

⟨comp-expr-list⟩ ::= ⟨comp-expr⟩ ',' ⟨comp-expr-list⟩ | ⟨comp-expr⟩

⟨multi-range⟩ ::= ⟨range⟩ ';' ⟨multi-range⟩ | ⟨range⟩

FIG. 5

| Benchmark | Type | Data size | Iteration size | # EDTs | # Fp / EDT |
|---|---|---|---|---|---|
| DIV-3D-1 | Param. (1) | $256^3$ | $256^3$ | 1 K | 128 K |
| FDTD-2D | Const. | $1000^2$ | $500 \cdot 1000^2$ | 148 K | 48 K |
| GS-2D-5P | Param. (2) | $1024^2$ | $256 \cdot 1024^2$ | 16 K | 80 K |
| GS-2D-9P | Param. (2) | $1024^2$ | $256 \cdot 1024^2$ | 16 K | 144 K |
| GS-3D-27P | Param. (2) | $256^3$ | $256^4$ | 256 K | 6.75 M |
| GS-3D-7P | Param. (2) | $256^3$ | $256^4$ | 256 K | 1.75 M |
| JAC-2D-COPY | Const. | $1000^2$ | $1000^3$ | 60 K | 80 K |
| JAC-2D-5P | Param. (2) | $1024^2$ | $256 \cdot 1024^2$ | 16 K | 80 K |
| JAC-2D-9P | Param. (2) | $1024^2$ | $256 \cdot 1024^2$ | 16 K | 144 K |
| JAC-3D-27P | Param. (2) | $256^3$ | $256^4$ | 256 K | 6.75 M |
| JAC-3D-1 | Param. (2) | $256^3$ | $256^3$ | 1 K | 112 K |
| JAC-3D-7P | Param. (2) | $256^3$ | $256^4$ | 256 K | 1.75M |
| LUD | Const. | $1000^2$ | $1000^3/8$ | 60 K | 10 K |
| MATMULT | Const. | $1024^2$ | $1024^3$ | 64 K | 32 K |
| P-MATMULT | Const. | $256^2$ | $\sum_{i=1}^{256} i^3$ | 1 K | 32 K |
| POISSON | Const. | $1024^2$ | $32 \cdot 1024^2$ | 11 K | 96 K |
| RTM-3D | Param. (2) | $256^3$ | $256^3$ | 1 K | 512 K |
| SOR | Const. | $10,000^2$ | $10,000^2$ | 10 M | 5 K |
| STRSM | Const. | $1500^2$ | $1500^3$ | 200 K | 16 K |
| TRISOLV | Const. | $1000^2$ | $1000^3$ | 60 K | 16 K |

Table 1

FIG. 8

| Benchmark | EDT version | 1 th. | 2 th. | 4 th. | 8 th. | 16 th. | 32 th. | Benchmark | EDT version | 1 th. | 2 th. | 4 th. | 8 th. | 16 th. | 32 th. |
|---|---|---|---|---|---|---|---|---|---|---|---|---|---|---|---|
| DIV-3D-1 | DEP | 2.53 | 4.51 | 6.52 | 6.65 | 7.24 | 5.27 | JAC-3D-1 | DEP | 2.58 | 4.80 | 8.17 | 9.36 | 8.38 | 7.36 |
|  | BLOCK | 2.54 | 4.41 | 5.87 | 6.91 | 6.72 | 5.09 |  | BLOCK | 3.14 | 4.68 | 7.62 | 9.67 | 8.71 | 6.53 |
|  | ASYNC | 2.82 | 2.82 | 2.62 | 2.60 | 2.36 | 2.18 |  | ASYNC | 2.77 | 3.55 | 3.26 | 2.90 | 2.67 | 1.78 |
| FDTD-2D | DEP | 1.19 | 2.21 | 4.08 | 7.19 | 10.85 | 10.03 | JAC-3D-7P | DEP | 2.21 | 4.21 | 7.03 | 11.72 | 17.07 | 19.09 |
|  | BLOCK | 1.12 | 2.10 | 3.08 | 6.88 | 8.44 | 7.94 |  | BLOCK | 2.28 | 4.54 | 7.78 | 14.30 | 25.16 | 26.37 |
|  | ASYNC | 1.17 | 2.23 | 4.31 | 7.94 | 12.20 | 10.73 |  | ASYNC | 2.18 | 4.11 | 7.76 | 14.19 | 25.82 | 27.00 |
| GS-2D-7P | DEP | 0.98 | 1.90 | 3.04 | 5.27 | 8.45 | 10.82 | LUD | DEP | 2.45 | 4.15 | 4.38 | 5.28 | 7.47 | 7.14 |
|  | BLOCK | 0.81 | 1.50 | 2.90 | 4.58 | 4.80 | 4.45 |  | BLOCK | 1.05 | 1.94 | 2.45 | 2.41 | 1.76 | 1.59 |
|  | ASYNC | 0.84 | 1.63 | 3.13 | 5.75 | 6.26 | 5.25 |  | ASYNC | 1.38 | 2.47 | 3.34 | 3.09 | 2.71 | 2.50 |
| GS-2D-9P | DEP | 0.98 | 1.96 | 3.30 | 5.07 | 9.42 | 13.72 | MATMULT | DEP | 4.29 | 8.44 | 15.64 | 25.29 | 43.30 | 40.63 |
|  | BLOCK | 0.91 | 1.78 | 3.34 | 5.94 | 8.30 | 7.23 |  | BLOCK | 4.24 | 8.51 | 15.27 | 28.34 | 42.02 | 42.17 |
|  | ASYNC | 0.95 | 1.85 | 3.61 | 6.56 | 11.29 | 8.96 |  | ASYNC | 3.96 | 4.12 | 4.05 | 4.12 | 3.99 | 2.57 |
| GS-3D-27P | DEP | 1.82 | 3.62 | 6.54 | 11.74 | 21.89 | 32.14 | P-MATMULT | DEP | 1.36 | 2.75 | 3.68 | 5.01 | 6.72 | 8.44 |
|  | BLOCK | 1.78 | 3.61 | 6.93 | 12.87 | 24.78 | 37.41 |  | BLOCK | 1.26 | 2.62 | 4.55 | 7.25 | 7.62 | 6.24 |
|  | ASYNC | 1.81 | 3.56 | 6.88 | 12.89 | 24.64 | 37.77 |  | ASYNC | 1.28 | 2.48 | 4.66 | 8.37 | 9.33 | 5.58 |
| GS-3D-7P | DEP | 1.60 | 3.19 | 5.02 | 8.46 | 14.80 | 21.56 | POISSON | DEP | 0.65 | 1.00 | 1.54 | 2.13 | 2.57 | 2.29 |
|  | BLOCK | 1.52 | 3.05 | 5.84 | 10.81 | 20.58 | 33.06 |  | BLOCK | 0.25 | 0.48 | 0.40 | 0.48 | 0.36 | 0.27 |
|  | ASYNC | 1.54 | 3.08 | 5.87 | 10.93 | 20.40 | 33.99 |  | ASYNC | 0.35 | 0.55 | 0.63 | 0.59 | 0.53 | 0.47 |
| JAC-2D-COPY | DEP | 4.28 | 7.57 | 12.79 | 21.43 | 28.73 | 23.39 | RTM-3D | DEP | 3.05 | 5.49 | 9.68 | 16.79 | 22.30 | 19.64 |
|  | BLOCK | 3.53 | 6.71 | 11.39 | 14.17 | 13.34 | 13.22 |  | BLOCK | 3.06 | 5.76 | 9.80 | 17.11 | 21.78 | 19.73 |
|  | ASYNC | 3.81 | 7.28 | 13.77 | 23.93 | 26.21 | 23.92 |  | ASYNC | 3.26 | 2.95 | 3.09 | 3.10 | 2.73 | 2.56 |
| JAC-2D-5P | DEP | 2.05 | 4.01 | 5.96 | 8.92 | 13.51 | 16.88 | SOR | DEP | 0.57 | 0.98 | 1.43 | 1.93 | 2.46 | 2.40 |
|  | BLOCK | 1.57 | 2.99 | 5.49 | 8.46 | 8.80 | 8.16 |  | BLOCK | 0.19 | 0.59 | 0.49 | 0.41 | 0.41 | 0.35 |
|  | ASYNC | 1.58 | 3.15 | 5.98 | 10.76 | 16.35 | 10.17 |  | ASYNC | 0.27 | 0.51 | 0.50 | 0.45 | 0.42 | 0.40 |
| JAC-2D-9P | DEP | 1.46 | 3.06 | 5.58 | 10.24 | 17.54 | 17.78 | STRSM | DEP | 5.82 | 10.51 | 14.77 | 20.29 | 22.77 | 22.28 |
|  | BLOCK | 1.51 | 2.86 | 5.47 | 9.73 | 15.09 | 15.76 |  | BLOCK | 2.75 | 7.78 | 6.00 | 5.01 | 3.84 | 2.94 |
|  | ASYNC | 1.55 | 2.96 | 5.58 | 10.72 | 19.13 | 18.80 |  | ASYNC | 3.50 | 6.23 | 6.82 | 6.39 | 5.69 | 5.07 |
| JAC-3D-27P | DEP | 2.42 | 4.75 | 8.72 | 15.66 | 25.69 | 28.10 | TRISOLV | DEP | 1.96 | 3.58 | 4.13 | 5.81 | 7.90 | 8.39 |
|  | BLOCK | 2.41 | 4.90 | 9.20 | 16.77 | 31.64 | 34.96 |  | BLOCK | 1.11 | 2.29 | 2.98 | 2.35 | 1.79 | 1.76 |
|  | ASYNC | 2.39 | 4.68 | 8.95 | 16.68 | 31.74 | 35.15 |  | ASYNC | 1.30 | 2.40 | 3.47 | 3.23 | 1.87 | 2.63 |

Table 2

FIG. 9

| Benchmark | version | 1 th. | 2 th. | 4 th. | 8 th. | 16 th. | 32 th. |
|---|---|---|---|---|---|---|---|
| GS-3D-7P | DEP | 1.61 | 3.28 | 6.21 | 11.46 | 21.20 | 32.88 |
| GS-3D-27P | DEP | 1.82 | 3.62 | 6.94 | 13.03 | 25.02 | 34.83 |
| JAC-3D-7P | DEP | 2.12 | 3.91 | 7.44 | 13.19 | 20.18 | 25.11 |
| JAC-3D-27P | DEP | 2.38 | 4.81 | 8.79 | 16.04 | 30.78 | 33.31 |

Table 3

FIG. 10

| Benchmark | Sizes | Gran. | 1 th. | 2 th. | 4 th. | 8 th. | 16 th. | 32 th. |
|---|---|---|---|---|---|---|---|---|
| LUD | 16-16-16 | 3 | 0.92 | 1.54 | 2.55 | 3.49 | 2.04 | 1.41 |
| LUD | 16-16-16 | 4 | 1.85 | 3.66 | 6.63 | 11.44 | 16.68 | 9.56 |
| LUD | 64-64-64 | 3 | 2.41 | 4.66 | 8.01 | 13.34 | 14.15 | 10.80 |
| LUD | 64-64-64 | 4 | 1.94 | 3.63 | 5.73 | 6.54 | 6.22 | 3.46 |
| LUD | 10-10-100 | 3 | 1.90 | 3.57 | 6.55 | 11.64 | 16.25 | 10.67 |
| LUD | 10-10-100 | 4 | 1.83 | 3.56 | 6.63 | 11.64 | 14.39 | 9.93 |
| SOR | 100-100 | 2 | 0.64 | 1.21 | 2.28 | 4.15 | 6.85 | 5.18 |
| SOR | 100-1000 | 2 | 0.64 | 1.28 | 2.09 | 3.46 | 4.84 | 4.18 |
| SOR | 200-200 | 2 | 0.63 | 1.26 | 2.31 | 4.28 | 7.04 | 8.16 |
| SOR | 1000-1000 | 2 | 0.67 | 1.21 | 2.03 | 2.79 | 2.97 | 2.73 |

Table 5

FIG. 12

| Benchmark | EDT version | 1 th. | 2 th. | 4 th. | 8 th. | 16 th. | 32 th. | Benchmark | EDT version | 1 th. | 2 th. | 4 th. | 8 th. | 16 th. | 32 th. |
|---|---|---|---|---|---|---|---|---|---|---|---|---|---|---|---|
| DIV-3D-1 | OCR | 2.44 | 3.89 | 4.84 | 6.64 | 6.45 | 5.63 | JAC-3D-7P | OCR | 2.18 | 4.14 | 7.80 | 14.17 | 25.50 | 26.75 |
|  | OMP | 3.02 | 5.65 | 7.62 | 8.86 | 8.76 | 8.46 |  | OMP | 1.93 | 2.15 | 2.62 | 4.12 | 7.42 | 12.66 |
|  | SWARM | 1.91 | 4.00 | 6.38 | 8.06 | 8.28 | 2.96 |  | SWARM | 2.12 | 3.81 | 7.32 | 13.74 | 24.84 | 26.09 |
| FDTD-2D | OCR | 1.20 | 2.51 | 4.34 | 8.13 | 13.96 | 17.14 | JAC-3D-1 | OCR | 2.97 | 4.71 | 8.38 | 9.46 | 8.35 | 6.71 |
|  | OMP | 0.83 | 0.29 | 0.50 | 0.95 | 1.41 | 2.46 |  | OMP | 3.33 | 5.70 | 11.61 | 19.59 | 17.53 | 13.67 |
|  | SWARM | 1.17 | 2.07 | 3.91 | 7.46 | 11.91 | 13.75 |  | SWARM | 2.16 | 5.91 | 7.93 | 11.14 | 12.14 | 3.18 |
| GS-2D-5P | OCR | 0.89 | 1.72 | 3.23 | 5.90 | 10.38 | 15.04 | LUD | OCR | 1.66 | 2.72 | 5.21 | 7.33 | 7.67 | 4.91 |
|  | OMP | 1.13 | 1.14 | 1.16 | 1.19 | 1.22 | 1.28 |  | OMP | 0.57 | 0.78 | 0.94 | 0.67 | 0.59 | 0.98 |
|  | SWARM | 0.58 | 1.65 | 3.11 | 5.74 | 9.73 | 3.11 |  | SWARM | 2.02 | 2.93 | 4.70 | 6.91 | 7.71 | 1.35 |
| GS-2D-9P | OCR | 0.98 | 1.90 | 3.61 | 6.67 | 12.05 | 18.24 | MATMULT | OCR | 4.37 | 8.35 | 15.05 | 26.80 | 45.72 | 43.77 |
|  | OMP | 1.17 | 1.16 | 1.18 | 1.17 | 1.19 | 1.20 |  | OMP | 1.21 | 2.38 | 4.49 | 8.37 | 15.73 | 14.41 |
|  | SWARM | 0.96 | 1.85 | 3.70 | 6.51 | 11.51 | 11.88 |  | SWARM | 4.46 | 8.58 | 15.49 | 28.87 | 49.44 | 35.53 |
| GS-3D-7P | OCR | 1.55 | 3.04 | 5.87 | 10.91 | 20.72 | 34.25 | PMATMULT | OCR | 1.37 | 2.59 | 4.89 | 8.81 | 14.46 | 15.60 |
|  | OMP | 1.75 | 2.21 | 3.01 | 4.90 | 7.83 | 11.17 |  | OMP | 1.98 | 2.97 | 5.48 | 9.12 | 15.98 | 20.14 |
|  | SWARM | 1.56 | 2.93 | 5.64 | 10.64 | 20.29 | 32.71 |  | SWARM | 1.35 | 2.66 | 5.05 | 9.35 | 13.55 | 3.82 |
| GS-3D-27P | OCR | 1.82 | 3.50 | 6.80 | 12.95 | 24.77 | 37.53 | POISSON | OCR | 0.46 | 0.64 | 1.14 | 1.71 | 1.43 | 1.08 |
|  | OMP | 2.06 | 3.16 | 5.51 | 10.16 | 18.86 | 29.26 |  | OMP | 1.01 | 0.97 | 1.02 | 0.99 | 0.96 | 0.84 |
|  | SWARM | 1.84 | 3.32 | 6.80 | 12.78 | 24.45 | 37.19 |  | SWARM | 0.44 | 0.63 | 0.99 | 1.41 | 1.57 | 0.27 |
| JAC-2D-COPY | OCR | 4.05 | 7.57 | 14.34 | 25.66 | 44.81 | 42.90 | RTM-3D | OCR | 3.00 | 5.38 | 9.65 | 15.84 | 24.42 | 17.48 |
|  | OMP | 4.25 | 5.30 | 7.33 | 12.60 | 19.90 | 18.00 |  | OMP | 2.40 | 4.59 | 8.03 | 15.77 | 29.06 | 22.67 |
|  | SWARM | 3.67 | 6.12 | 11.34 | 21.40 | 35.51 | 9.37 |  | SWARM | 2.83 | 5.95 | 9.76 | 18.02 | 26.23 | 12.34 |
| JAC-2D-5P | OCR | 1.71 | 3.22 | 6.11 | 11.08 | 18.98 | 21.72 | SOR | OCR | 0.28 | 0.56 | 0.98 | 1.65 | 1.27 | 0.93 |
|  | OMP | 0.92 | 0.92 | 0.91 | 1.13 | 1.40 | 2.19 |  | OMP | 0.62 | 1.01 | 1.59 | 2.66 | 4.42 | 6.62 |
|  | SWARM | 1.63 | 3.15 | 5.84 | 10.63 | 17.58 | 6.15 |  | SWARM | 0.26 | 0.45 | 0.68 | 1.17 | 0.86 | 0.22 |
| JAC-2D-9P | OCR | 1.58 | 3.00 | 5.84 | 10.52 | 18.09 | 21.54 | STRSM | OCR | 4.49 | 7.58 | 11.76 | 17.62 | 15.95 | 11.72 |
|  | OMP | 1.09 | 1.14 | 1.20 | 1.31 | 1.67 | 2.64 |  | OMP | 3.66 | 5.60 | 10.52 | 19.84 | 37.97 | 39.15 |
|  | SWARM | 1.50 | 3.00 | 5.58 | 10.27 | 18.53 | 19.48 |  | SWARM | 2.82 | 4.15 | 7.39 | 13.04 | 17.88 | 2.79 |
| JAC-3D-27P | OCR | 2.41 | 4.70 | 8.94 | 16.72 | 31.66 | 34.48 | TRISOLV | OCR | 1.64 | 2.95 | 4.89 | 7.63 | 7.55 | 5.29 |
|  | OMP | 2.43 | 3.43 | 5.66 | 10.36 | 18.87 | 25.95 |  | OMP | 2.09 | 4.29 | 7.77 | 15.15 | 28.67 | 23.28 |
|  | SWARM | 2.40 | 4.53 | 8.75 | 16.21 | 30.67 | 34.51 |  | SWARM | 1.56 | 2.84 | 4.88 | 7.88 | 9.77 | 1.37 |

Table 4

FIG. 11

SYSTEM AND METHOD FOR GENERATION OF EVENT DRIVEN, TUPLE-SPACE BASED PROGRAMS

CROSS-REFERENCE TO RELATED APPLICATIONS

This application is related to an claims benefit of priority to U.S. Provisional Patent Application Ser. No. 61/880,592, file on Sep. 20, 2013 and entitled "System and Method for Generation of Event Driven, Tuple-Space Based Programs," which is incorporated herein by reference in its entirety.

GOVERNMENT LICENSE RIGHTS

This invention was made with Government support under Award No. DE-SC0008717, awarded by the Department of Energy. The Government has certain rights in the invention.

FIELD OF THE INVENTION

This specification relates generally to optimizing compilers and, in particular, to automatic techniques that facilitate parallel spawning of tasks on runtimes that support event-driven tasks (EDTs).

BACKGROUND

Despite predictions on the end of Moore years, for both physical and economic reasons Intel has recently declared Moore's law alive and well. However, as the number of transistors fitting a given chip area continues to grow, so does the energy required to enable them, resulting in the heat envelope supported by the packaging being reached. The era of sequential computing relying on ever increasing clock speeds and decomposition of the processing pipeline into ever shorter stages indeed appears to have come to an end. As Gflops per Watt replaced traditional GHz, clock speeds stopped increasing and performance metrics started shifting. Subsequently, due to the same power wall which halted frequency scaling, the end of multi-core scaling was predicted. Some commentators estimate that for any chip organization and topology, multi-core scaling will also be power limited. To meet the power budget, they project, ever more significant portions of the chip will have to be turned off to accommodate the increase in static power loss from increasing transistor count. We are thus entering the "dark silicon" era.

From the point of view of programming models, in order to meet the requirements on power consumption and the necessary levels of parallelism for keeping the hardware busy, one answer pursued by researchers is the exploration of large-scale dataflow-driven execution model. In the dark silicon era as well as at Exascale levels of parallelism, the envisioned architectures are likely ill-balanced and will likely exhibit highly volatile performance and failure characteristics. It is envisioned that applications will, at least partially, steer away from the MPI bulk-synchronous model and may rely on relocatable tasks, scheduled by a dynamic, adaptive, work-stealing runtime.

These relocatable tasks are known as Event-Driven Tasks (EDTs). At least one of the runtimes, the Open Community Runtime (OCR), can support the execution model on the Intel Runnemede research architecture. In this context, communication and locality are performance and energy bottlenecks. Latencies to remote data will generally grow to accommodate lower energy budgets devoted to communication channels. As such, to hide these long latency operations, it is beneficial to overprovision the software and massive amounts of parallelism may need to be uncovered and balanced efficiently and dynamically. In some systems, such as GPGPU based systems, and in particular in CUDA, a user may specify more parallelism than can be exploited for the purpose of hiding latencies. The user specification of parallelism, however, is generally not based on any systematic analysis of the loop-carried dependencies and, as such, may not lead to parallelization necessary to meet simultaneously the performance requirements and power budgets.

Traditional approaches to parallelism typically require the programmer to describe explicitly the sets of operations that can be parallelized in the form of communicating sequential processes (CSPs). The fork-join model and the bulk-synchronous model are commonly used methodologies for expressing CSPs, for shared and distributed memory systems, respectively. As multi-socket, multi-core computers are becoming ubiquitous and are trending towards ever more cores on chip, new parallel programming patterns are emerging. Among these patterns, the task-graph pattern is being actively pursued as an answer to the overprovisioning and load-balancing problems. This model can support a combination of different styles of parallelism (data, task, pipeline). At a very high-level, the programmer writes computation tasks which can: (1) produce and consume data, (2) produce and consume control events, (3) wait for data and events, and (4) produce or cancel other tasks. Dependences between tasks must be declared to the runtime which keeps distributed queues of ready tasks (i.e., whose dependences have all been met) and decides where and when to schedule tasks for execution. Work-stealing can be used for load-balancing purposes. Specifying tasks and dependences that are satisfied at runtime is common to CnC, OCR, SWARM and to other Event Driven runtimes.

The user specification tasks, however, is generally not based on any systematic analysis of the program to be executed, so as to enable a portioning of the operations of the program into tasks that can fully exploit the parallel-processing power of a target runtime. Because the tasks themselves are often defined without the benefit of a systematic analysis, the dependencies associated with the tasks are usually not expressed to the parallelization necessary to achieve the required performance and/or to meet a power budget.

One transformation system for expressing tasks and dependencies therebetween is based on the polyhedral model. Some transformation systems allows for intricate transformation compositions, but the applicability of these system is generally limited because they employ static dependence analysis. Such transformation systems generally decide at compile time whether to parallelize a loop structure or not and, as such, typically require excessive compile times and/or may not achieve the parallelization that can be obtained using EDT-based runtimes. Some techniques can expand the scope of analyzable codes by (1) computing inter-procedural over- and under-approximations that present a conservative abstraction to the polyhedral toolchain, and (2) by introducing more general predicates that can be evaluated at runtime through fuzzy-array dataflow analysis. In practice, conservative solutions mix well with the polyhedral toolchain through a stubbing (a.k.a. blackboxing) mechanism and parallelism can be expressed across irregular code regions. Unfortunately this is not sufficient because the decision to parallelize or not remains an all-or-nothing compile-time decision performed at the granularity of the loop. In contrast EDT-based runtimes allow the expression of fine-grain parallelism down to the level of the individual instruction (overhead permitting), and the transformation systems discussed above do not permit runtime exploration of parallelism. Some techniques allow for performing speculative and runtime parallelization using the expressiveness of the polyhedral model. In these techniques, the speculation may be erroneous and/or the compile time can be too long.

In some techniques, a dependence analysis based on a directed acyclic graph (DAG) of linear-memory array descriptors can generate lightweight and sufficient runtime predicates to enable adaptive runtime parallelism. These methods may enable runtime evaluation of predicates, and can result in significant speedups on benchmarks with difficult dependence structures. In these techniques, however, parallelism is still exploited in a fork-join model via the generation of OpenMP annotations and, as such, these techniques generally limit the parallelization and performance benefits that can be achieved using EDT-based runtimes that use the event-driven task model.

SUMMARY

In various embodiments, the systems and methods described herein enable automatic generation of event-driven, tuple-space-based programs from a sequential program specification. A hierarchical mapping solution using auto-parallelizing compiler technology can generate EDT instances for several different EDT-based runtimes. This is achieved, at least in part, by employing (1) a mapping strategy with selective trade-offs between parallelism and locality to extract fine-grained EDTs, and (2) a retargetable runtime application program interface (API) that can capture common aspects of the EDT programming model and can allow for uniform translation, porting, and comparisons between runtimes. Specifically, complex loop nest restructuring transformations are applied to construct a logical tree representation of a program to be executed using an EDT-based runtime. This representation is mapped to a tree of EDT types. Each EDT type is associated with a unique (id, tag tuple) pair in the generated program. Dependency statements based on tag tuples can be generated at compile time, and these statements allow for determining, at runtime, whether a required dependency is met. A runtime-agnostic layer (RAL) (e.g., a C++ layer) may be used for retargeting the statements that spawn, at runtime, EDT instances corresponding to each EDT type and/or for retargeting one or more dependency statements to any selected runtime e.g., Intel's CnC, ETI's SWARM, and the Open Community Runtime (OCR).

In general, various embodiments of the systems and methods described herein perform program analysis and transformation in a systematic, automated manner. An analyzable sequential specification may be converted into an intermediate representation. Thereafter, instance-wise (corresponding to loop instances) dependence analysis with extensions to support encapsulated non-affine control-flow hidden within summary operations (a.k.a. blackboxes), may be performed. Scheduling may be used to optimize a trade-off between parallelism, locality, and/or other metrics (e.g., estimated peak power, estimated total energy, etc.). Non-orthogonal tiling of imperfectly nested loops with a heuristic that balances a model of data reuse, cache sizes, and performance of streaming prefetches may also be performed, and may be followed by EDT formation from a tree representation of the tiled program. Dependencies between EDT instances of various EDT types are then generated. RAL code may be generated, which when targeted to a selected runtime (i.e., compiled for the selected runtime), can enable that runtime to determine dependencies between different tasks to be executed by the runtime. The RAL can allow for performing EDT-instance-dependency analysis independently of the implementation details of any selected runtime, while simultaneously allowing for expressing such dependencies to not just one particular runtime but to any selected runtime.

In relation to related techniques, the various embodiments described herein are significantly different at least as follows. First, the analysis and synthesis process, that may be implemented by a system configured to perform one or more process steps, is generic and can target different runtimes. The process is extensible to other runtimes that may become available in the future. The experiments discussed below show the variability between three different runtimes and the benefit of a nimble, adaptive strategy, as facilitated by various embodiments. Second, the process can be decentralized and can be fully asynchronous in the creation of tasks and the dependences therebetween. Other solutions generally must first construct a full graph and then only begin useful work, which can be computationally expensive, if not prohibitive. Considering Amdahl's law, the process according to various embodiments can scale on a large numbers of processors and distributed memory. Third, the baseline dependence specification mechanism according to various embodiments is scalable at both compile-time and runtime by virtue of exploiting loop types and dependence information on restructured loops available from the scheduler.

Accordingly, in one aspect a method is provided for specifying event-driven tasks (EDTs) for execution by an EDT-based runtime. The method includes analyzing by a processor an EDT structure corresponding to a loop structure in code to be executed using an EDT-based runtime. Specifically, the method includes determining by the processor one or more dependencies between a pair of instances. A first instance may correspond to the EDT structure and a second instance may correspond to the EDT structure or to another different EDT structure. The determination is based on, at least: (i) a type of the loop structure, and (ii) a union of respective individual iteration domains of one or more statements associated with the loop structure. A loop structure, in general, includes two or more nested loops but can include a single loop. Examples of EDT-based runtimes include, but are not limited to, SWARM, OCR, and CnC.

In some embodiments, the EDT structure comprises a tuple that includes: (a) a unique identifier, and (b) start and stop levels associated with the corresponding loop structure. A tuple-based tag associated with an EDT structure/type is typically different than a tuple-based tag associated with instances of the EDT type/structure. Specifically, in tags of the EDT type/structure, the start level typically corresponds to a parent of the EDT type/structure and the stop level may correspond to the outermost loop of the loop structure. In the tags associated with the instances, the start and stop levels may correspond to the levels of the outermost and innermost loops of a loop structure associated with the EDT type/structure corresponding to the EDT instances.

In some embodiments, the code includes a loop nest, and the loop nest includes the loop structure corresponding to the EDT structure. The loop nest may include another loop structure, corresponding to a different EDT structure. The start level may correspond to a depth of the other loop structure, and the stop level may correspond to a depth of the loop structure that corresponds to the EDT structure. In some embodiments, the code includes a loop nest, and the loop nest includes the loop structure corresponding to the EDT structure. The stop level may corresponds to a depth of the loop structure corresponding to the EDT structure, and the start level may correspond to a level/depth of a root node, which can be designated to be zero, one, or any other suitable number. The determination of a dependency that is included within the one or more dependencies may be further based on the start and stop levels in the tuple.

In some embodiments, the method further includes generating the union of respective individual iteration domains of the one or more statements associated with the loop structure. The method may also include synthesizing by the processor an EDT-instance generation statement causing the EDT-based runtime to spawn a number of EDT instances. All of the spawned instances may corresponding to the EDT structure that is analyzed. Alternatively or in addition, the method may include synthesizing at least one dependency statement specifying at least one of the one or more dependencies, if at least one dependency is determined to exist between the pair of instances.

In one embodiment, the type of the loop structure corresponding to the EDT structure is sequential. The one or more dependency statements that may be synthesized include a first dependency statement and a second dependency statement. The first dependency statement may cause a dummy task to wait for completion of all operations that correspond to the one or more statements associated with the loop structure and that are designated to a first EDT instance of the pair. Thus, the dummy statement waits till all operations that corresponds to a certain iteration of the sequential loop have been completed. The second dependency statement may cause all operations that correspond to the one or more statements associated with the loop structure and that are designated to a second EDT instance of the pair to wait for completion of the dummy task. Thus, operations corresponding to a next iteration of the sequential loop must wait for the completion of the dummy task and, in effect, must wait for all tasks/operations that are associated with a previous iteration of the sequential loop.

In some embodiments, the type of the loop structure corresponding to the EDT structure is a permutable, and the loop structure includes an $n_d$-dimensional loop nest that includes $n_d$ permutable loops. At least one antecedent instance in each of the $n_d$ dimensions, and at least one subsequence instance are associated with the EDT type/structure. The dependency statement may cause operations designated to the subsequent instance to wait for completion of all operations that are designated to at most one antecedent instance in each of one or more of the $n_d$ dimensions. Thus, for a particular task associated with a band of permutable loops, dependencies may be evaluated at runtime with respect to at the most one task, and not all tasks, associated with a loop in each dimension of the band of permutable loops.

In some embodiments, the second instance corresponds to the other different EDT structure/type. Another different loop structure is associated with the other EDT structure/type. The union of respective iteration domains may further include respective iteration domains of one or more statements associated with the other loop structure. As such, at least one dependency statement may cause a task associated with the first instance to wait for completion of at least one operation (e.g., if the other loop structure is permutable, and all operations, if the other loop structure is sequential) that correspond to the one or more statements associated with the other loop structure and that is designated to the second EDT instance.

Synthesis of one or more dependency statements may include deriving by the processor a templated task tag that includes a tuple that includes: (a) a unique identifier, and (b) start and stop levels associated with the corresponding loop structure. The derivation of the templated task tag may include computing a number of dimensions ($n_d$) of loops that may cause iterations of statements associated with the loop structure corresponding to the EDT structure. The derivation may also include generating a statement for computing a number of iterations based on respective bounds of a loop in each dimension.

In some embodiments, the method includes marking by the processor, one or more loop nodes in a tree of nested loops representing loops in the code. The marking may be performed, based on at least one of: (i) a type of the loop, (ii) a position of the loop within the tree of nested loops, and (iii) user specification. The type of the loop can be sequential. The position of the loop within the tree of nested loops may include one of: (i) a loop at tile granularity, and (ii) a loop having a sibling in the tree of nested loops. In some embodiments, the type of the loop is permutable, a parent of the loop is within a different band, and the parent is unmarked.

The method may further include constructing by the processor a tree of EDT structures that includes the EDT structure that is analyzed. Each node in the tree of EDT structures may represent a different EDT structure corresponding to a respective marked loop node in the tree of nested loops. In some embodiments, the method includes constructing, by the processor, a tree of nested loops representing loops in the code. Each loop node in the tree of nested loops may correspond to a different loop in the code. The method may further include transforming loops in the code. Alternatively or in addition, the method may include tiling loops in the code.

In some embodiments, the method is hierarchical and includes designating the structure as a parent EDT structure. The method also includes extracting by the processor from the parent EDT structure a child-EDT structure. The child structure is associated with a child loop structure that excludes at least one loop from the loop structure associated with the parent structure. The first instance of pair of instances may correspond to the child-EDT structure, and the second instance of the pair of instances may correspond to the child EDT-structure or to the parent EDT-structure.

In another aspect, a computer system includes a first processor and a first memory coupled to the first processor. The first memory includes instructions which, when executed by a processing unit that includes the first processor and/or a second processor, program the processing unit to determine one or more dependencies between a pair of instances. A first instance may correspond to the EDT structure and a second instance may correspond to the EDT structure or to another different EDT structure. The determination is based on, at least: (i) a type of the loop structure, and (ii) a union of respective individual iteration domains of one or more statements associated with the loop structure. A loop structure, in general, includes two or more nested loops but can include a single loop. Examples of EDT-based runtimes include, but are not limited to, SWARM, OCR, and CnC. In some embodiments, the second memory coupled to the second processor can receive through a network the instruction stored in the first memory. In various embodiments, the instructions can program the processing unit to perform one or more of the method steps described above.

In another aspect, an article of manufacture that includes a non-transitory storage medium has stored therein instructions which, when executed by a processor program the processor to determine one or more dependencies between a pair of instances. A first instance may correspond to the EDT structure and a second instance may correspond to the EDT structure or to another different EDT structure. The determination is based on, at least: (i) a type of the loop structure, and (ii) a union of respective individual iteration domains of one or more statements associated with the loop structure. A loop structure, in general, includes two or more nested loops but can include a single loop. Examples of EDT-based runtimes include, but are not limited to, SWARM, OCR, and CnC. In various embodiments, the instructions stored in the article of manufacture can program the processor to perform one or more of the method steps described above.

BRIEF DESCRIPTION OF THE DRAWINGS

The implementations depicted therein are provided by way of example, not by way of limitation, wherein like reference numerals generally refer to the same or similar elements. In different drawings, the same or similar elements may be referenced using different reference numerals. The drawings are not necessarily to scale, emphasis instead being placed upon illustrating aspects of the invention. In these drawings:

FIG. 2 illustrates an exemplary process of generating a structure of EDT types, according to one embodiment;

FIG. 3 illustrates an example of a process of determining dependencies in permutable loops, according to one embodiment;

FIG. 4 depicts an example of a loop nest that includes sequential loops;

FIG. 5 depicts an example of a templated expression that can be used to express and/or evaluate dependency between tasks, according to one embodiment;

FIGS. 8-12 respectively include Tables 1-5, showing various experimental results for three different runtimes.

DETAILED DESCRIPTION

Figure 1:
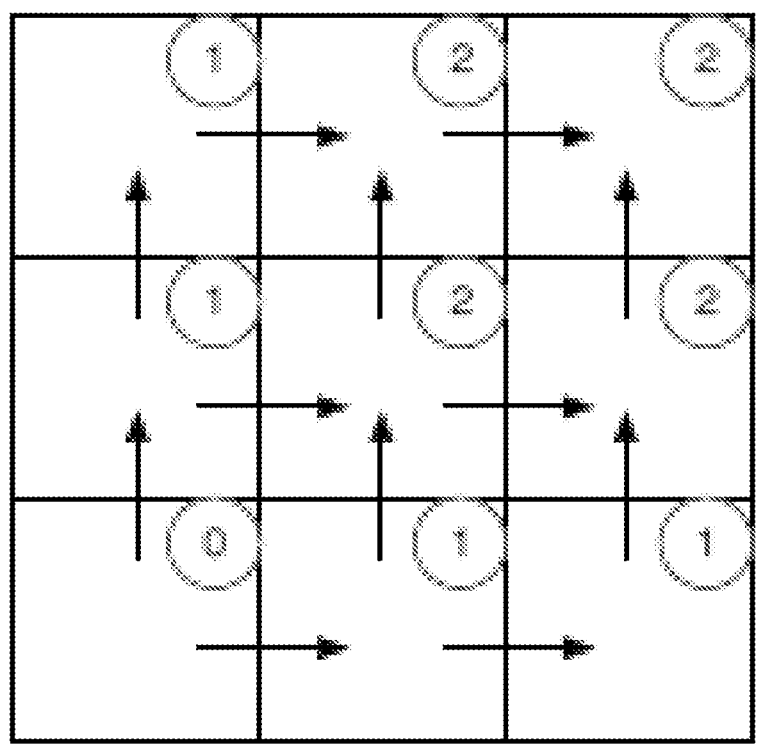
FIG. 1 schematically depicts an example of an EDT antecedent graph.

In various embodiments, an intermediate representation of a code to be executed using an EDT-based runtime is based on a hierarchical dependence graph. The nodes of the graph may be statements that represent operations grouped together in the internal representation. A typical unit of program analysis and transformation is a statement. A statement S can be simple or arbitrarily complex (i.e., an external precompiled object), as long as it can be approximated conservatively. The edges of the graph are dependences as defined below. An iteration domain for S, $D^S$ is an ordered multi-dimensional set of iterations. An instance of an iteration is written as $i_S$. The (lexicographic) order relation between two iterations i and j is defined by $i \ll j$ if and if and only if i occurs before j in the program. By introducing y, the symbolic, constant parameters of the program, an iteration domain is the set $\{i_s \in D^S(y)\}$. Operations to manipulate domains and their inverse include projections to extract information along a sub-domain; image by a function to transform a domain into another domain; intersection to construct the iterations that are common to a list of domains; and index-set splitting to break a domain into disjoint pieces. Exact projection operations are computationally expensive, sometimes prohibitively so, even at compile time. The implications are discussed below.

A scheduling function $\Theta^S$ is a linear affine function that partially reorders the iterations of S in time. The order $\ll$ extends to time after scheduling is applied. In this context, a dependence (T→S) is a relation $\mathcal{R}$ between the set of iterations of S and T and expresses that T depends on S. This relation conveys the information that some iteration $i^T \in D^T(y)$ depends on $i^S \in D^S(y)$ (i.e., they access the same memory location by application of a memory reference) and that $i^S$ $i^T$ in the original program. Set relation $\{(i^T, i^S) \in \mathcal{R}_{T \to S}(y)\}$ or $\mathcal{R}_{T \to S}(y)$ are typically generated to refer to the specific iterations of T and S that take part in the dependence. The multigraph of statement nodes and dependence edges is referred to as the generalized dependence graph (GDG), and a GDG=(V,E), i.e., a set of vertices and edges in the graph, respectively, is generated in various embodiments.

The code to be executed using the EDT-based runtime may be parallelized using a scheduler (e.g., Pluto) that can optimize parallelism and locality in sequences of imperfectly nested loops. Optimization may be obtained by unifying the tilability conditions with scheduling techniques. The following is a brief review the affine scheduling formulation. In one embodiment, the input of the affine scheduling problem is a GDG. Following the standard conventions, $\phi_S$ is used to denote a 1-dimensional affine schedule for statement S. For each edge in the GDG:

$$\delta(y) \geq \phi_T(i_T, y) - \phi_S(i_S, y) \geq 0, (i_T, i_S) \in \mathcal{R}_{T \to S}(y)$$

By combining all of the dependences of the program, a feasible linear space that can be subject to various optimization problems can be formed. The parametric affine form $\delta(y)$ can be interpreted as the maximal dependence distance between any two schedules. In particular, if $\delta(y)$ can be minimized to 0, then the solution $\phi$ is communication-free and is thus parallel. Similarly, if $\delta(y)$ can be minimized to a positive constant c, then only local communication is needed and broadcast can be eliminated. One iterative algorithm allows finding an independent solution that is valid for the same set of dependence edges. This implies the induced loops are permutable.

Scalable Dependence Computation Between EDTs: The EDT-based runtimes typically require the programmer to specify dependences between EDTs to constrain the order of execution for correctness purposes. Dependence relations may be exploited by the runtime to determine when a task is ready and may be scheduled for execution. An EDT-specific challenge lies in the tractable computation of dependences at compile-time and the overhead of their exploitation at runtime.

The requirements for dependence relations between EDTs are significantly different than for dependence analysis between statements. The analysis of dependence between statements is only concerned with original program order of statements and can be captured by the set.

$$\mathcal{R}_{T \to S}(y) = \{(i^S, i^T) \in D^S \times D^T | i^S \ll i^T, M_S[i^S] = M_T[i^T]\},$$

where $M_S$ and $M_T$ are memory access functions (typically Read-After-Write affine indices in the same array). Array dataflow analysis goes a step further and takes into account all possible interleaved writes to keep only the true producer-consumer dependences. A dataflow dependence can then be expressed as:

$$\mathcal{F}_{T \to S}(y) = R_{T \to S}(y) - \left\{ \bigcup_W \prod_{T \times S} (R_{T \to W}(y) \times R_{W \to S}(y)) \right\},$$

where Π is the projection operator from T×W×S to T×S. The formulation with set differences and the projector operator merely simplifies the exposition of the problem. Even if the projection operator is not explicitly stated, the dependency analysis nevertheless requires the solution of a parametric Integer Linear Programming (ILP) problem, which can be computationally intensive.

In contrast, while determining dependences between EDTs one or more of the following factors are also taken into account. In some embodiments, ordering may need to be computed on a transformed schedule, and the scheduling may include tiling transformations, possibly at several levels. Different instances of a statement may belong to the same tile. This is a projection operation that cannot be avoided when computing dependences exactly. By virtue of exploiting parallelism, the "last-write" information generally becomes dynamic and may introduce the need for sets of dependence relations.

One way to specify these relations automatically is to compute exactly the dependences between tasks at compile-time based on producer-consumer relationships. This, however, can lead to the following problems: First, the dependences may be redundant. A straightforward dependence algorithm only considers producer-consumer relations on accesses to memory locations. In the context of EDTs, without special treatment to prune redundancies, all these dependences would be generated and can translate into a high runtime overhead.

Second, perfectly pruning dependences statically requires the static computation of the "last-write" the general solution of which is a Quasi-Affine Selection Tree (QUAST). Computing this information exactly is often very expensive computationally, and is sometimes prohibitively expensive on original input programs or code to be executed using a EDT-based runtime. After scheduling and tiling, the complexity of the "last-write" computation is further increased by the application of a projection operator (e.g., because several statement instances may belong to the same tile instance).

Finally, the dependence relations between tasks are generally non-convex, arising from the projection of the dependence relation on a sub-space. The projection operator is non-convex. With reference to FIG. 1, consider the possible dependence paths between the origin=(0, 0) and (i, j)=(1,1). These correspond to the number of paths of Manhattan distance two between these points on a uniform 2-D grid. In particular, task (i, j)=(0, 0) has no antecedents and can start immediately whereas (i, j)=(1, 1) has two antecedents. Task (i, j) has i·j redundant dependences (i.e. the "volume" of the i×j region) which reduces to 0, 1, or 2 transitively unique dependences. In general, for one level of hierarchy, the number of these dependences varies according to whether the task coordinates lie on the edge vertex, edge line, or on the interior of the 2D task space. This case can be handled by creating a centralized, sequential loop that scans the Cartesian product of iteration spaces of source and destination EDTs for each single dependence. This mechanism, however, incurs high computational overhead. To amortize/minimize such overhead, tile sizes are generally kept large. However, if overprovisioning is to be achieved, it is desirable to have significantly smaller EDTs, and the overhead of having small EDTs is computationally expensive, if not prohibitive, when a Cartesian-product based technique is used for exploring the dependencies.

Various embodiments described below facilitate efficient instantiation and execution of tasks by an EDT-based runtime, without incurring significant runtime and compile-time computation overheads. The operation of an exemplary system and an exemplary method is based on loop properties rather than requiring explicit computation all possible dependences between tasks.

Tree Representation and EDT Formation: Specifically, in one embodiment, after scheduling and tiling, the transformed program/code is represented as a tree of imperfectly nested loops, similar to an abstract syntax tree (AST). While the discussion below generally refers to a tree of loops, any suitable structure such as annotated lists or arrays, a database, etc., can be used to represent the program/code to be executed using a selected EDT-based runtime and, in particular, the loop structures in such program/code. Two main differences are noted below between a traditional AST and a tree of loops. First, the tree of nested loops representation is oblivious to the effects of loop transformations (which may include peeling, loop shifting, parameter versioning, and index-set splitting). Advantageously, this representation thus allows for compositions of transformations that can maximize parallelism that may be needed for overprovisioning, as discussed above. The code generation can address the intricacies of reforming the control-flow-efficient transformed loop nests. Second, subsequent loop transformations may be further composable and can preserve the independence of the representation with respect to complex control flow.

In various embodiments, the tree of nested loops structure is characterized by the integer "beta vector" that specifies relative nesting of statements. Statements have identical first d beta component if and only if they are nested under d common loops. The bounds of the loops may be completely different for each statement. As soon as the beta component differ, the loops are distributed, the order of the loops being consistent with the order of the beta component.

Each node in the tree therefore corresponds to a loop and has a loop type associated therewith. To uniformize the EDT extraction process, a root node may be introduced in the tree. The root node does not correspond to any loop but is the antecedent of all nodes of the tree. With reference to FIG. 2, in one embodiment, a breadth-first traversal is performed on the tree structure that is induced by the beta vectors, so as to mark certain nodes of the tree. This process can form sequences of perfectly nested consecutive loops with compatible types for dependence inference purposes, as discussed below. In particular, permutable loops of the same band can be mixed with parallel loops. Permutable loops belonging to different bands, however, are not be mixed in one implementation.

The BFS traversal may be stopped when the granularity of a tile is reached. This can create EDTs at the granularity of tiles. Alternatively the user may specify the nodes to be marked, ignoring the tile granularities. The process introduces the remaining nodes necessary to accommodate: (a) changes in permutable bands, (b) sequential loops, and (c) imperfectly nested loops that may require too many dependences (as one example in some situations, nodes that have siblings). The processing of all of these nodes is described below.

Once a tree of nested loops (a structure, in general) is marked, one compile-time EDTs is formed for each marked non-root node, as follows: A new unique identifier (ID) is selected for the EDT type that is being constructed for a visited node. The start and stop levels for this EDT type are also determined. The start level is the level of the first marked ancestor of the node for which the EDT type is being constructed, and the stop level is the level of the node. The statements nested below the node are filtered and attached to the current EDT type, i.e., the EDT type being constructed. A union of iteration domains is designated as the iteration domain of the EDT type. The union of iteration domain includes a union of the individual domains of all of the statements associated with the EDT type being constructed.

This process yields a tree of EDT types. It should be understood that, the tree is only one structure used for illustration and other structures such as annotated lists, arrays, a database, etc., are within the scope of various embodiments. The coordinates of each EDT type can be expressed in a multidimensional tag space, and are uniquely determined by the loops [0, stop] in the code. Coordinates [0, start) are received from the parent EDT type, and the coordinates [start, stop] can be determined locally from loop expressions and from loop levels. The combination of an EDT ID and its coordinates can uniquely identify each EDT instance.

Dependence Specification With Loop Types Information: In one embodiment, while performing EDT instance-level dependence analysis, a direct relation between iterations in the source and target domains is obtained. These relations tend to be computationally less expensive than Cartesian-product-based expressions and, as such, can be used to determine efficiently at compile time the expression of EDT-level dependencies. Such determination of dependencies and synthesis of corresponding dependency statements usually does not require computation of projections. The synthesized dependency statements can be evaluated at runtime in a distributed, asynchronous mode and generally not require iterating over a high-dimensional loop nest at runtime. In particular, to avoid iterations over a high-dimensional loop nest at runtime, a decentralized view of the problem employs a get-centric approach in which at runtime, an EDT instance can query one or more predecessors thereof whether those predecessors have finished respective executions thereof. This approach minimizes the number of puts in a concurrent hash table, which are notoriously more expensive than gets.

Individual dependence relations between statements are generally non-invertible. Consider the relation [i, i]→[i, j], i.e., iteration [i, i] depends on iteration [i, j]. Forming the inverse relation requires a projection, which typically gives rise to many dependences at runtime. A particular advantage of various embodiments is that although individual dependence relations between statements may require projections, aggregate dependence relations between EDT instances may not. Loop types exhibited by the scheduler allows for a scalable computation of these aggregate dependences, as described below. Parallel loops are the simplest type of dependence relation in the program: they carry no dependence. As a consequence, no special conditional needs to be evaluated at runtime.

A permutable band of loops over induction variables $(i_1, \ldots, i_n)$ has only forward dependences. These can always be expressed conservatively by the set of n invertible relations:

$$\{[i_1, i_2, \ldots, i_n] + e_k \rightarrow [i_1, i_2, \ldots, i_n], k \in [1, n]\},$$

where $e_k$ is the canonical unit vector in dimension k. In order to infer dependences for a nest of permutable loops each task determines from its coordinates in the task space whether it is a boundary task or an interior task and which other tasks it depends on. For the purpose of illustration, consider a three-dimensional (3D) task (i.e., n=3, and loops (i, j, k) are loops across tasks or are inter-task loops). It should be understood that three as the number of dimensions is illustrative only and that in general, a permutable loop structure can include a single loop, two permutable loops, or more than three (e.g., 4, 6, 10) permutable loops. In various embodiments, the tags corresponding to EDT types or structures are different than the tags associated with EDT instances corresponding to a particular EDT type/structure. The tags associated with the EDT instances can account for the loops of the loop structure that is associated with the corresponding EDT type/structure. In this example, the instance tags are based on the bounds of loops i, j, and k, and can uniquely identify the different instances of the permutable loop band (i, j, k).

An example of a code segment depicted in FIG. 3 can exploit dependences of distance one along each dimension, i.e., Boolean expressions are formed by plugging i−1, j−1, and k−1 into the expression of the loop bounds. For each permutable loop dimension, we introduce a condition to determine whether the antecedent of the task along that dimension is part of the interior of the inter-task iteration space. When the condition evaluates to true, the task must wait (i.e. get) for its antecedent to complete. To illustrate, FIG. 3 depicts an example of the interior_1 computation for the dimension corresponding to loop i. Booleans interior_2 and interior_3 for the dimensions j and k, respectively, can also be determined.

Sequential loop is the most restrictive type for loops. It imposes a fully specified execution order on the current loop with respect to any loop nested below it. To visualize these effects, consider the code depicted in FIG. 4 as an example. In this example, the function f reads a portion of array A such that the dependence structure is (seq, doall, seq, doall). Suppose that a task has the granularity of a single (t, i, j, k) iteration of the innermost statement. The dependence semantic from loop t is that any task (t, i, j, k) depends on all of its antecedents (t−1, *, *, *). Similarly from loop j, any task (t, i, j, k) depends on all of its antecedents (t, i, j−1, *). If all dependence relations were to be exposed to the runtime, the t loop would require evaluation of N dependences which generally prohibitive for a typical loop bound N.

In one embodiment, this problem can be addressed by generating a dummy, one-dimensional (1D) fan-in/fan-out task, similar to a tbb::empty_task. This has the effect of reducing the "Cartesian product" effect of dependence relations. The dependence semantic then becomes: any task (t, i, j, k) depends on sync(t) and sync(t) depends on all tasks (t−1, i, j, k). The number of dependences thus reduces to 2 $N^3$ which is significantly smaller than $N^6$ dependencies. Depending on the value of N, the reduced number of dependencies 2 $N^3$ can still impose a significant runtime overhead. As such, in one embodiment employs hierarchical separation of concerns for sequential loops. Specifically, an additional level of hierarchy can be generated in the task graph associated with a sequential loop (e.g., the loop j), effectively acting as a tbb::spawn_root_and_wait. To accommodate this separation of concerns, different runtime EDTs, each targeted for a particular EDT-based runtime can be generated for each compile time EDT.

Runtime Agnostic Layer: In one embodiment, a runtime agnostic layer (RAL) includes a set of C++ templated classes to build expressions evaluated at runtime, along with an application program interface (API) to be used by a compiler targeting a selected runtime. Languages other than C++ allowing templated structures or permitting emulation of templated structures (e.g., via macros) can also be used. The API aims at being a greatest common denominator for features across runtimes. In one embodiment, a central element is the templated TaskTag which encapsulates the tuple holding the coordinates of the EDT type being analyzed in the tag space. Specialized tuples for each runtime can be derived from this TaskTag and may optionally extend the TaskTag with synchronization constructs to implement async-finish. TaskTags may be passed along with EDT instantiation statements as function parameters in a selected runtime such as SWARM, OCR, and CnC.

Templated Expressions: In one embodiment, template expressions were used to capture complex loop expressions and to dynamically evaluate, at runtime, inverse dependence relations. An exemplary assignment depicted in FIG. 5 can encode the multi-dimensional ranges generated by some embodiments of the EDT-dependency determination method described above. Operations on these ranges take tuples as input and may return Booleans or other tuples. The operations include evaluation of the expression at a tuple, comparisons at a tuple, and computations of the minimum and maximum given a tuple range (bounding box computation). These expressions may be used as described below, referring back to FIG. 3. First a tuple of "terms" is created that encapsulates the induction variables (t1, t2, t3), i.e., (i, j, k) in FIG. 3, and parameters (T, N) of the code, any of which may appear in one or more loop-bound expressions. Then, templated expressions p1, p2, and p3 are declared which capture the lower and upper bound expressions governing the iterations of the terms. Lastly, based on the lower and upper bound expression, runtime dependences are generated using a templated construct which can dynamically capture the non-convex Boolean evaluations from FIG. 3. These expressions are oblivious to the complexity of the loop expressions which can become a severe bottleneck in a polyhedral IR based on dual representation of constraints and vertices. The tradeoff is the runtime overhead for constructing and evaluating the expression templates. Experiments with vtune and particular efforts in one embodiment in keeping this overhead low by using C++11's constexpr types and declaring the expressions static, show an overhead below 3% in the worst cases encountered during testing.

Figure 6:
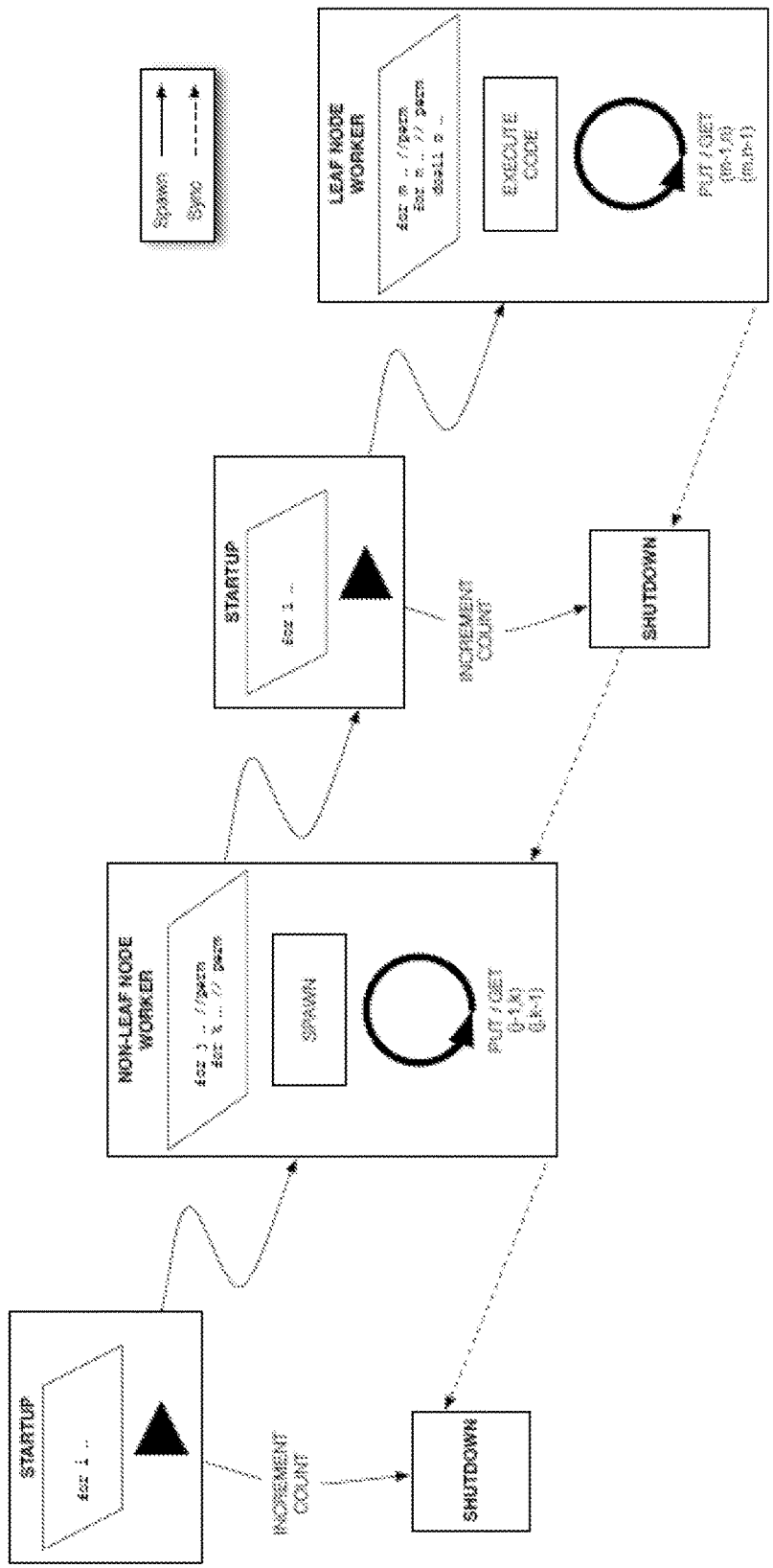
FIG. 6 schematically depicts an organization of EDTs spawning and synchronization.

EDT Code Generation: The code generation process can create different runtime EDTs for each compile-time EDT. FIG. 6 illustrates the organization of spawning and synchronizations across the three types of EDTs. Specifically, a code generator (e.g., CLOOG) may be used to walk a tree of EDT types in a recursive, top-down traversal. Each EDT type may be represented in its own separate file. These EDT types can be compiled independently (e.g., using gcc or any suitable compiler) and may be linked with the runtime library to produce the final executable. SHUTDOWN EDTs, as depicted in FIG. 6, do not require special treatment, they include similar code, parameterized by the TASKTAG. Each STARTUP and WORKER EDT is parameterized by a start and a stop level. Until the start level, three behaviors can be observed: (1) induction variables and parameters may be retrieved directly from the EDT tag by using the overloading of TaskTag::operator=, (2) loops are forcibly joined by forming the union of their domains, and (3) loops are forcibly emitted as conditionals. Between the start and stop levels, the code generation process follows the normal behavior of CLOOG, separating statements and generating loops and conditionals in each subbranch of the code tree. After the stop level, behavior depends on the type of EDT. Specifically, for a STARTUP, a counting variable increment in the first loop is generated and the spawning of WORKER EDTs in the second loop is also generated. For a non-leaf WORKER, code is generated to spawn recursively STARTUP, and for a leaf WORKER, the computations and communications corresponding to the actual work are generated, as described above.

The hierarchical code for spawning tasks that is depicted in FIG. 6 corresponds to a loop nest of loops: (i, j, k, l, m, n, o) that have types: (seq, perm, perm, seq, perm, perm, doall). As such, all tasks corresponding to a particular iteration of the loop i and that associated with the non-leaf WORKER wait for the completion of all of the tasks associated with the previous iteration of the sequential loop i. Within a particular iteration of the loop i, a task associated with the permutable loops j and k need not depend on all of the previous iterations of the loops j and k. Instead, a task associated with a particular iteration depends only on a antecedent task in the j−1 dimension and/or an antecedent task in the k−1 dimension. These tasks, however, include the iterations of the sequential loop l. Here again, all of the tasks associated with a particular iteration of loop l depend on the completion of all of the tasks associated with the previous iteration of the sequential loop l. A task associated with a particular iteration of the loops m, n, and o need not wait for the completion of all of the tasks corresponding to all the previous iterations in the m and n dimensions. Instead, such as task may depend on nothing more than the completion of antecedent tasks in either one or both of the m−1 and n−1 dimensions.

Concurrent Collections (CnC) is a high-level coordination language that lets a domain expert programmer specify semantic dependences in a program without worrying about what runs where and when. CnC has a task-graph model that is implicit in the program representation by using hash tables. Intel-CnC is supplied with a work-stealing runtime whose default scheduler is built on top of the scheduler provided by Intel's Threading Building Blocks(TBB). CnC uses tbb::concurrent_hashmap to implement step and item collections. A step is a C++ object that implements an execute method; it represents a scheduled unit of execution. The CnC scheduler decides at runtime which step::execute methods are called on which hardware thread and on which processor. This step::execute method takes a step tag reference and a context reference. A step becomes available when an associated step tag is put in the proper step collection. A step may perform multiple gets and puts from/to item collections. Item collections act as dataflow dependence placeholders. By default, a CnC get is blocking. If it fails, control is given back to the scheduler which re-enqueues the step to await the corresponding tag put. Once that put occurs, the step restarts. In a worst-case scenario, each step with N dependences may invoke N−1 failing gets and be requeued as many times. Additionally, on a step suspension, the gets are rolled back. Performing all gets of a step before any put offers determinism guarantees.

ETI's SWift Adaptive Runtime Machine (SWARM) is a low-level parallel computing framework that shares similarities with CnC. Additionally, SWARM handles resource objects and allows active messages and continuation passing style. SWARM is a C API that makes extensive use of pre-processor macros. In SWARM, an EDT is declared as a C macro and scheduled into the runtime by calling the swarm_schedule function. An EDT accepts a context parameter THIS and an optional parameter INPUT that come in the form of pointers. SWARM allows more complex behaviors where a parent EDT specifies a NEXT and NEXT_THIS parameter to allow chaining of multiple EDTs. SWARM also allows an EDT to bypass the scheduler and dispatch another EDT immediately using swarm_dispatch. The tagTable put and get mechanisms in SWARM are fully non-blocking. It is the responsibility of the user to handle the synchronization properly, to re-queue EDTs for which all gets did not see matching puts, and to terminate the flow of execution for such EDTs. SWARM presents a lower-level runtime and API and allows many low level optimizations.

Figure 7:
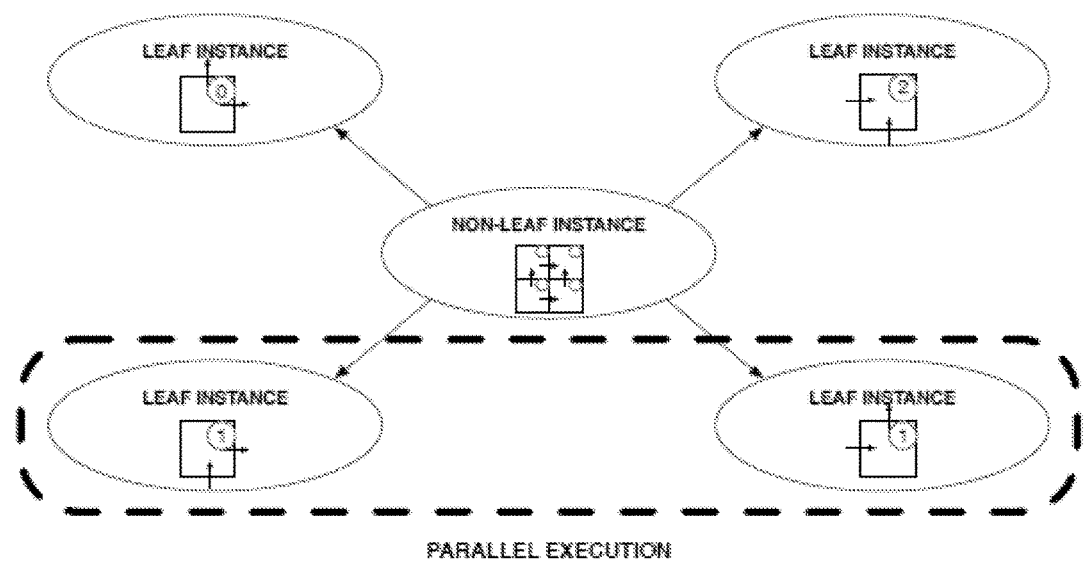
FIG. 7 schematically depicts hierarchical EDTs.

The Open Community Runtime (OCR) is a another runtime system based on EDTs and work-stealing principles. OCR represents the task graph explicitly and does not rely on tag hash tables. In OCR, different objects can be specified as "events," whether they represent EDTs, blocks of data ("datablocks"), or synchronization objects. OCR does not natively rely on a tag space. Instead, when an EDT is spawned, all the events it depends on must have already been created by the runtime and must be passed as dependence parameters to the EDT. By contrast, in CnC and SWARM, when a get is performed, the corresponding hash table entry can be viewed as a type of "synchronization future." There is effectively a race condition between the first get, the subsequent gets and the first put with a given tag. Additionally, mapping to a tag tuple to an event is necessary to create the synchronizations. Without a hash table, OCR requires the pre-allocation of a large number of synchronization events (as is demonstrated in the Cholesky example that is supplied with OCR). In one embodiment, a prescriber in the OCR model was implemented to solve this race condition. Puts and gets are performed in a tbb::concurrent_hash_map following the CnC philosophy. In various embodiments, the PRESCRIBER step is completely oblivious to the compiler and is fully handled by the RAL. In the targeted OCR according to some embodiments, each WORKER EDT is dependent on a PRESCRIBER EDT which increases the total number of EDTs. Lastly, in some of the embodiments that use OCR as the runtime hierarchical async-finish may be supported natively via the use of a special "finish-EDT." CnC, SWARM can run on both shared and distributed memory systems, and OCR may be extended for distributed systems Runtime Support for Hierarchical Async-Finish: Various embodiments support hierarchical async-finish tasks in OCR, SWARM and CnC. In various embodiments, the system and method describe herein can generate EDTs that conform to a hierarchical execution model from sequential input code. In particular, FIG. 7 illustrates parallelism across hierarchical WORKER EDTs. WORKER instances in the non-leaf worker (center circle) are connected by point-to-point dependences. Within each top-level WORKER, bottom-level WORKER are spawned, and may themselves connected by point-to-point dependences. Instances that are not connected by dependences (i.e. the unordered bottom-left and bottom-right instances in the example depicted in FIG. 7) can be executed in parallel by the runtime. This is a coarse level of parallelism. Additionally, within each leaf worker, finer grained parallelism can also exploited by the runtime.

OCR natively supports hierarchical async-finish by virtue of the "finish EDT." OCR also provides "latch" objects that can be used to emulate this feature like in SWARM, as discussed below. The other two runtimes do not currently provide native support and, hence, in various embodiments a layer of emulation that a source-to-API compiler targets automatically is constructed.

SWARM natively supports "counting dependence" objects which are similar to OCR latches. In some embodiments, this feature is used as follows: Within each STARTUP code which determines how many WORKER are spawned is generated. A swarm_Dep_t object is allocated and default initialized to the number of WORKS that can be spawned. When both the counter and the counting dependence are ready, a SHUTDOWN is chained to await on the dependence object with the associated count value. When the dependence count reaches zero, the SHUTDOWN is awoken. A pointer to the swarm_Dep_t object is passed as a parameter into the tag of each WORKER instance. At this point, the current instance of STARTUP can spawn all its WORKERs. When several levels of hierarchy are involved, each instance of a leaf WORKER may satisfy the dependence to the SHUTDOWN spawned by their common enclosing STARTUP. A non-leaf WORKER may relegate the dependence satisfaction to the SHUTDOWN spawned by the same STARTUP instance. SHUTDOWN may satisfy the counting dependence of their respective callers, up until the main SHUTDOWN, which stops the runtime.

CnC does not natively support async-finish or even counting dependences. A reduction operator may be developed. In one embodiment, using a C++11 atomic<int>, each WORKER upon completion of the tasks designated thereto performs an atomic decrement of the shared counter. As for SWARM, the counter is constructed and passed by calling STARTUP. Unlike SWARM, the ability to notify the SHUTDOWN on the event that the counter reaches zero is lacking. Therefore, in various embodiments to perform this synchronization in CnC, a SHUTDOWN performs a "get" of an item that is only put in the corresponding item collection by the unique WORKER EDT that decrements the counter to zero (i.e. the dynamically "last" one). Unlike SWARM and OCR which provide their own mechanisms, this emulation relies on the item collection (a hashtable) to perform the signaling. However, accesses to this hashtable are very rare: only the last WORKER and the associated SHUTDOWN write and read the hashtable, respectively.

Experiments

The numbers presented herein may be viewed as a baseline performance achievable from a sequential specification automatically translated into EDTs before single thread tuning is applied and in the absence of data and code placement hints to the runtime. In particular, no single thread performance optimization for SIMD, no data-layout transformation, and no tile size selection heuristic or tuning were applied except where specified. The mapping decisions were the same in all EDT cases except where specified. Tile sizes for EDTs in these experiments were fixed to 64 for the innermost loops and 16 for non-innermost loops. This is by no means optimal but just a heuristic for overdecomposition to occur while keeping a reasonable streaming prefetch and single thread performance. These numbers are illustrative only. The results were compared to automatically generated OMP using a framework that includes a static heuristic for tile size selection. The static tile sizes selected for OMP are expected to load-balance the execution over a statically fixed number of cores and may also account for streaming memory engines.

Table 1 in FIG. 8 gives a characterization of the experiments. For each benchmark, it was specified whether the benchmark contains symbolic parameters (and if so, how many), the data and iteration space size as well as the number of EDTs generated and the maximum number of floating point operations per full EDT (at the tile size granularities described above). In order to characterize latencies and stress-test the different runtimes, the experiments were diverse in their sizes, running from a mere 53 ms in single thread sequential mode (JAC-3D-1) up to 97 s (JAC-3D-27P).

Experiments were performed on a two socket, eight core per socket Intel Sandy Bridge E5-2690 @ 2.90 GHz running Fedora Core 19. Each core was additionally hyperthreaded for a maximum of 32 threads of execution. All experiments were run using "g++-4.8.0-O3" and linked with a C++ RAL that was targeted to Intel's CnC v0.8, ETI's SWARM v0.13, and to the Open Community Runtime (OCR) v0.8.

CnC Dependence Specification Alternatives: CnC allows for three different modes of specifying dependences. In one embodiment, the RAL for CnC uses blocking "get" and is referred to as BLOCK. This mechanism may introduce unnecessary overhead. In another embodiment, the RAL was retargeted to target CnC's unsafe_get/flush_gets mechanism to provide more asynchrony. This mechanism is similar conceptually to the non-blocking gets in SWARM. A third CnC mechanism, according to another embodiment, is the so-called depends mechanism. For each task, all of its dependences were pre-specified at the time of task creation. This is similar to the PRE-SCRIBEREDT that may be generated automatically for OCR, in one embodiment. Table 2 in FIG. 9 shows the baseline performance achieved by the CnC generated codes when varying the way dependences are specified. Unsurprisingly, blocking "gets" result in significant overheads in cases where many smaller EDTs are generated, which require more calls into the runtime. This effect is not problematic in the larger 3D cases. More surprising is the fact that DEP performs significantly worse in the cases GS-3D-7P, GS-3D-27P, JAC-3D-7P and JAC-3D-27P. This was conjectured not to be due to runtime overhead but due to scheduling decisions. To confirm this, the following experiment was conducted: Two levels of hierarchical EDTs were generated, which effectively increases the potential runtime overhead for DEP. In these codes, the non-leaf WORKER had the granularity of the two outermost loops, whereas the leaf WORKER has the granularity of an original EDT(16-16-16-64). Despite the increased runtime overhead to manage these nested tasks, up to 50% speedup was achieved, as shown in Table 3 in FIG. 10.

SWARM, OCR and OpenMP: The numerical results obtained with SWARM, OCR and OpenMP, depicted in Table 4 in FIG. 11 are now discussed, according to different categories of benchmarks. This discussion applied to the results obtained for CnC as well. Embarrassingly Parallel Examples are ones for which no runtime dependences are required (DIV-3D-1, JAC-3D-1 RTM-3D and MATMULT). The runtimes for the first the examples is very low (53-210 ms on 1 thread), and can be viewed as a test of runtime latency overhead on very short runs, without dependences. MATMULT is a somewhat larger example. These examples show that SWARM has a smaller overhead than CnC and OCR for running parallel tasks, until reaching the hyperthreading mode where SWARM performance generally drops.

EDT granularity: LUD, POISSON and SOR illustrate relatively small examples for which the statically selected tile sizes is not adequate for EDT granularity purposes. In the case of POISSON pipeline startup cost is prohibitively expensive; choosing tile sizes of 2-32-128 yields around 7 Gflop/s with OCR on 32 threads, a 6× speedup. In the case of SOR, the tile sizes yield small tasks of merely 1024 iterations corresponding to 5K instructions; selecting larger tile sizes also improved performance. Overall, these examples show that relatively small tile sizes that achieve over-provisioning may not be beneficial, as discussed further below for SOR and LUD.

OpenMP Efficient Examples: STRSM and TRISOLV illustrate two cases which mix both parallel and permutable loops and for which OpenMP performs significantly better than any of the known EDT solutions. In this case, it was determined that the problem related to tile size selection for reuse. In the case of STRSM, by selecting a square tiles of size 64-64-64, a performance of up to 76 Gflop/s was obtained with OCR. The performance did not increase further with hyperthreading, however. In addition, forcing the OpenMP tile sizes to 16-16-64 capped the performance at 50 Gflop/s. In the case of TRISOLV, by selecting a tile of size 64-64-256, performance of up to 26 Gflop/s was obtained with OCR. This further demonstrated the need for a proper tile size selection in EDT-based runtimes. There is a difficult trade-off between over-decomposition, reuse, single thread performance, streaming prefetch utilization and problem size that should be solved in a dynamic and adaptive fashion.

2-D and 3-D Time Tiling. The remaining examples shows the benefit of EDTs. In those cases, performance for EDT-based codes scales significantly better than OpenMP performance, especially as the Jacobi examples (explicit relaxation scheme) move twice as much memory as GaussSeidel examples (implicit relaxation scheme) and do not scale as well from 16 to 32 threads (hyperthreading).

Effects of EDT Granularity: For LUD and SOR on which initial EDT performance was lower than expected, a few different tile sizes were explored and, additionally, two levels of granularity was explored for LUD, as shown in Table 5 in FIG. 12. The granularity parameter represents the number of loops in an EDT type. FIG. 3, for example, shows that there is a fine trade-off between EDT granularity, number of EDTs, and the cost of managing these EDTs. To confirm the runtime overhead as EDTs shrink in size, performance hotspots were collected using Intel Vtune amplxe-cl for LUD16-16-16 with granularities 3 and 4 at 16 threads. First, templated expressions calculations were performed but the load thereof was not noticeable, confirming the low extra overhead of evaluating such expressions. Second, in the case of granularity 4, more than 85% of the non-idle time was spent executing work, the rest being spent mostly in the OCR dequeInit function. However, at a finer granularity, the ratio of effective work dropped to merely 10% stealing and queue management taking up to 80%. The drop in performance between 16-16-16 and 10-10-100 suggests there is a critical threshold, possibly linked to last-level cache sizes, at which the overhead of OCR increases substantially.

There are a number of other runtimes that can be targeted using the various embodiments described herein. For example, the QUARK runtime can speed up the PLASMA linear algebra library with dynamic task scheduling and a task-oriented execution model, via parallelization explored automatically and systematically, based on, in part, loop types, as described in various embodiments. The task-oriented implementations of the linear algebra library can be used to regenerate implementations of such a linear algebra library taking advantage of the features of CnC, SWARM, and OCR. Furthermore, processes according to various implementations are oriented toward porting the library for impending architectural changes from exascale, such as very deep memory hierarchies. Other EDT oriented runtimes suitable for retargeting include the Qthreads Library and HPX.

In summary, various embodiments described herein present the first fully automatic solution that can generate event-driven, tuple-space based programs from a sequential specification for several EDT-based runtimes. This solution can performs hierarchical mapping and can exploit hierarchical async-finishes. This solution can also use auto-parallelizing compiler technology to target different runtimes relying on event-driven tasks (EDTs) via a runtime-agnostic layer. In different embodiments, the RAL has been retargeted to Intel's Concurrent Collections (CnC), ETI's SWARM, and the Open Community Runtime (OCR). The event-driven, tuple-space based programs obtained according to the embodiments described above generally resulted in performance improvements. The solution takes advantage of parallel and permutable loops to abstract aggregate dependences between EDT types.

Figure 13:
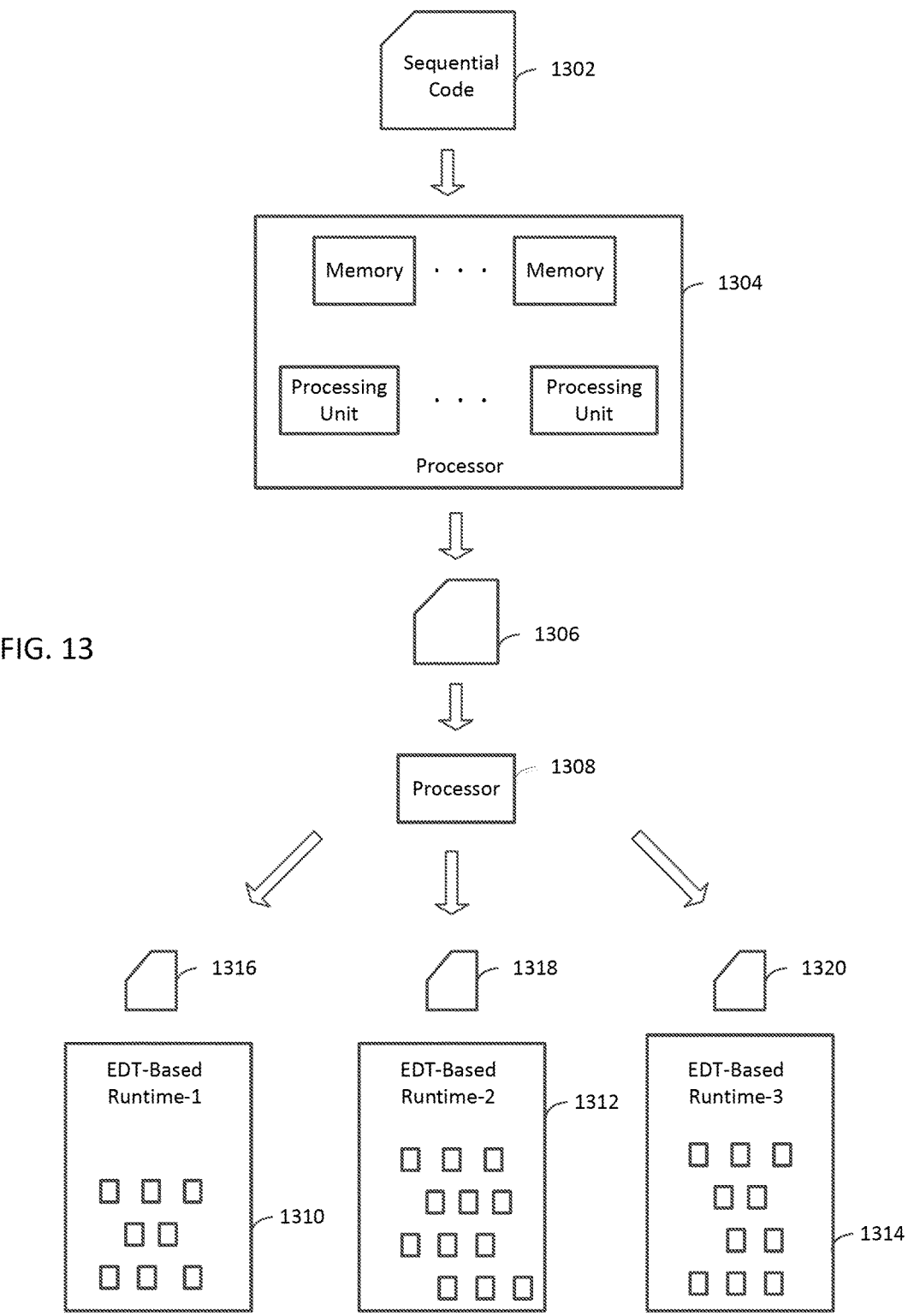
FIG. 13 depicts an example of a system according to one embodiment, and an example of the environment of such a system.

With reference to FIG. 13, sequential code 1302 is analyzed as described by a processor 1304. The processor 1304 can include a single processing unit and memory or, as depicted, several processing units and memory modules so that the analysis of the code 1302 and synthesis of statements that can spawn EDT instances and that can facilitate evaluation of dependencies between such instances can be performed using more than one processing units. The one or more statements can include the RAL. A code module 1306 that includes at least parts of the sequential code 1302 and the one or more statements generated by the processor 1304 are compiled by another processor 1308. Like the processor 1304, the processor 1306 can also include one or more processing units and/or one or more memory units. In some embodiments, a single hardware system can be configured as both the processor 1308 and the processor 1304.

The processor 1308 retargets the code module 1306 to one or more EDT-based runtimes, such as runtimes 1310-1314 depicted in FIG. 13. Three runtimes are shown for illustration only. In general, retargeting can be performed for fewer (e.g., 1 or 2) or more (e.g., 5, 10, etc.) different EDT-based runtimes. Each runtime typically includes several workers that can execute various tasks associated with the code 1302 in parallel, while observing the inter-task dependencies. The spawning of various tasks is facilitated by the runtime codes 1316-1320 for the corresponding runtimes. To this end, the processor 1304 facilitates, as described above, synthesis of statements that can spawn tasks by the target runtime and that enable the runtime to test whether a dependency exists between pairs of tasks and whether those dependencies have been satisfied.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communications protocols to facilitate communications between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communications with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communications protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

Accordingly, we claim:

1. A method of specifying event-driven tasks (EDTs) for an EDT-based runtime system comprising a plurality of processing units, the method comprising:
   for an EDT structure corresponding to a loop structure in code to be executed using an EDT-based runtime system, determining by a compiler executed on a processor a dependency relation expressing one or more dependencies between a pair of EDT instances, wherein:
   a first EDT instance and a second EDT instance in the pair is to be executed using the plurality of processing units of the runtime system,
   the first EDT instance corresponds to a first node of the EDT structure and the second EDT instance corresponds to a second node of the EDT structure or a node of another different EDT structure,
   the one or more dependencies cause an operation associated with the second instance to wait for completion of an operation associated with the first instance,
   the determination of the dependency relation is based on, at least: (i) a type of the loop structure, and (ii) a union of respective individual iteration domains of one or more statements from the loop structure that are associated with the first and second EDT instances, each iteration domain comprising a respective ordered multi-dimensional set of iterations, and
   the dependency relation enables the runtime system to determine the one or more dependencies between the first and second EDT instances during execution of EDTs associated with the EDT structure, without needing evaluation of dependences via a loop nest resulting from a projection operation and, instead, via the type of the loop structure and the union of the iteration domains.

2. The method of claim 1, wherein the EDT-based runtime comprises at least one of SWARM, OCR, and CnC.

3. The method of claim 1, wherein the EDT structure comprises a tuple comprising: (a) a unique identifier, and (b) start and stop levels associated with the corresponding loop structure.

4. The method of claim 3, wherein:
   the code comprises a loop nest, and the loop nest comprises the loop structure corresponding to the EDT structure and another loop structure corresponding to a different EDT structure; and
   the start level corresponds to a depth of the other loop structure, and the stop level corresponds to a depth of the loop structure corresponding to the EDT structure.

5. The method of claim 3, wherein:
   the code comprises a loop nest, and the loop nest comprises the loop structure corresponding to the EDT structure; and
   the stop level corresponds to a depth of the loop structure corresponding to the EDT structure.

6. The method of claim 3, wherein determination of a dependency within the one or more dependencies is further based on the start and stop levels in the tuple.

7. The method of claim 1, further comprising generating the union of respective individual iteration domains of the one or more statements associated with the loop structure.

8. The method of claim 1, further comprising:
   synthesizing by the processor an EDT-instance generation statement causing the EDT-based runtime to spawn a plurality of EDT instances, all instances corresponding to the EDT structure.

9. The method of claim 1, further comprising synthesizing at least one dependency statement specifying at least one of the one or more dependencies, if the at least one dependency is determined to exist between the pair of instances.

10. The method of claim 9, wherein:
    the type of the loop structure corresponding to the EDT structure is sequential; and
    the at least one dependency statement comprises a first dependency statement and a second dependency statement, wherein:
    the first dependency statement causes a dummy task to wait for completion of all operations that correspond to the one or more statements associated with the loop structure and that are designated to a first EDT instance of the pair; and
    the second dependency statement causes all operations that correspond to the one or more statements associated with the loop structure and that are designated to a second EDT instance of the pair to wait for completion of the dummy task.

11. The method of claim 9, wherein:
the type of the loop structure corresponding to the EDT structure is a permutable, the loop structure comprising an $n_d$-dimensional loop nest comprising $n_d$ permutable loops;
at least one antecedent instance in each of the $n_d$ dimensions, and at least one subsequence instance are associated with the EDT structure; and
the dependency statement causes operations designated to the subsequent instance to wait for completion of all operations that are designated to at most one antecedent instance in each of one or more of the $n_d$ dimensions.

12. The method of claim 9, wherein:
the second instance corresponds to the other different EDT structure, having associated therewith another different loop structure;
the union of respective iteration domains further comprises respective iteration domains of one or more statements associated with the other loop structure; and
the at least one dependency statement causes a task associated with the first instance to wait for completion of at least one operation that correspond to the one or more statements associated with the other loop structure and that is designated to the second EDT instance.

13. The method of claim 9, wherein synthesis of the at least one dependency statement comprises deriving by the processor a templated task tag comprising a tuple comprising: (a) a unique identifier, and (b) start and stop levels associated with the corresponding loop structure.

14. The method of claim 13, wherein the derivation of the templated task tag comprises:
computing a number of dimensions ($n_d$) of loops causing iteration of statements associated with the loop structure corresponding to the EDT structure; and
generating a statement for computing a number of iterations based on respective bounds of a loop in each dimension.

15. The method of claim 1, further comprising:
marking by the processor, one or more loop nodes in a tree of nested loops representing loops in the code, based on at least one of: (i) a type of the loop, (ii) a position of the loop within the tree of nested loops, and (iii) user specification.

16. The method of claim 15, wherein the type of the loop is sequential.

17. The method of claim 15, wherein the position of the loop within the tree of nested loops comprises one of: (i) a loop at tile granularity, and (ii) a loop having a sibling in the tree of nested loops.

18. The method of claim 15, wherein:
the type of the loop is permutable; and
a parent of the loop is within a different band; and
the parent is unmarked.

19. The method of claim 15, further comprising:
constructing by the processor a tree of EDT structures comprising the EDT structure, each node in the tree of EDT structures representing a different EDT structure corresponding to a respective marked loop node in the tree of nested loops.

20. The method of claim 15, further comprising:
constructing, by the processor, a tree of nested loops representing loops in the code, each loop node in the tree of nested loops corresponding to a different loop in the code.

21. The method of claim 20, further comprising transforming loops in the code.

22. The method of claim 20, further comprising tiling loops in the code.

23. The method of claim 1, further comprising designating the structure as a parent EDT structure and extracting by the processor from the parent EDT structure a child-EDT structure, the child structure being associated with a child loop structure that excludes at least one loop from the loop structure associated with the parent structure, wherein:
the first instance of pair of instances corresponds to the child-EDT structure; and
the second instance of the pair of instances corresponds to the child EDT-structure or the parent EDT-structure.

24. A system comprising: a first processor; and
a first memory coupled to the first processor, the first memory comprising instructions which, when executed by a processing unit comprising at least one of the first processor and a second processor, program the processing unit as a compiler, for facilitating specification of event-driven tasks (EDTs) for an EDT-based runtime system comprising a plurality of processing units, to:
determine, for an EDT structure corresponding to a loop structure in code to be executed using an EDT-based runtime system, a dependency relation expressing one or more dependencies between a pair of EDT instances, wherein:
a first EDT instance and a second EDT instance in the pair is to be executed using the plurality of processing units of the runtime system,
the first EDT instance corresponds to a first node of the EDT structure and the second EDT instance corresponds to a second node of the EDT structure or a node of another different EDT structure,
the one or more dependencies cause an operation associated with the second instance to wait for completion of an operation associated with the first instance,
the determination of the dependency relation is based on, at least: (i) a type of the loop structure, and (ii) a union of respective individual iteration domains of one or more statements from the loop structure that are associated with the first and second EDT instances, each iteration domain comprising a respective ordered multi-dimensional set of iterations, and
the dependency relation enables the runtime system to determine the one or more dependencies between the first and second EDT instances during execution of EDTs associated with the EDT structure, without needing evaluation of dependences via a loop nest resulting from a projection operation and, instead, via the type of the loop structure and the union of the iteration domains.

25. The system of claim 24, wherein the EDT-based runtime comprises at least one of SWARM, OCR, and CnC.

26. The system of claim 24, wherein the EDT structure comprises a tuple comprising: (a) a unique identifier, and (b) start and stop levels associated with the corresponding loop structure.

27. The system of claim 26, wherein:
the code comprises a loop nest, and the loop nest comprises the loop structure corresponding to the EDT structure and another loop structure corresponding to a different EDT structure; and
the start level corresponds to a depth of the other loop structure, and the stop level corresponds to a depth of the loop structure corresponding to the EDT structure.

28. The system of claim 26, wherein:

the code comprises a loop nest, and the loop nest comprises the loop structure corresponding to the EDT structure; and the stop level corresponds to a depth of the loop structure corresponding to the EDT structure.

29. The system of claim 26, wherein the instructions program the processing unit to:

determine a dependency within the one or more dependencies further based on the start and stop levels in the tuple.

30. The system of claim 24, wherein the instructions further program the processing unit to:

generate the union of respective individual iteration domains of the one or more statements associated with the loop structure.

31. The system of claim 24, wherein the instructions further program the processing unit to:

synthesize an EDT-instance generation statement causing the EDT-based runtime to spawn a plurality of EDT instances, all instances corresponding to the EDT structure.

32. The system of claim 24, wherein the instructions further program the processing unit to:

synthesize at least one dependency statement specifying at least one of the one or more dependencies, if the at least one dependency is determined to exist between the pair of instances.

33. The system of claim 32, wherein:

the type of the loop structure corresponding to the EDT structure is sequential; and the at least one dependency statement comprises a first dependency statement and a second dependency statement, wherein:

the first dependency statement causes a dummy task to wait for completion of all operations that correspond to the one or more statements associated with the loop structure and that are designated to a first EDT instance of the pair; and the second dependency statement causes all operations that correspond to the one or more statements associated with the loop structure and that are designated to a second EDT instance of the pair to wait for completion of the dummy task.

34. The system of claim 32, wherein:

the type of the loop structure corresponding to the EDT structure is a permutable, the loop structure comprising an $n_d$-dimensional loop nest comprising $n_d$ permutable loops;

at least one antecedent instance in each of the $n_d$ dimensions, and at least one subsequence instance are associated with the EDT structure; and the dependency statement causes operations designated to the subsequent instance to wait for completion of all operations that are designated to at most one antecedent instance in each of one or more of the $n_d$ dimensions.

35. The system of claim 32, wherein:

the second instance corresponds to the other different EDT structure, having associated therewith another different loop structure;

the union of respective iteration domains further comprises respective iteration domains of one or more statements associated with the other loop structure; and the at least one dependency statement causes a task associated with the first instance to wait for completion of at least one operation that correspond to the one or more statements associated with the other loop structure and that is designated to the second EDT instance.

36. The system of claim 32, wherein in order to synthesize the at least one dependency statement, the instructions program the processing unit to derive a templated task tag comprising a tuple comprising: (a) a unique identifier, and (b) start and stop levels associated with the corresponding loop structure.

37. The system of claim 36, wherein to derive the templated task tag, the instructions program the processing unit to:

compute a number of dimensions ($n_d$) of loops causing iteration of statements associated with the loop structure corresponding to the EDT structure; and generate a statement for computing a number of iterations based on respective bounds of a loop in each dimension.

38. The system of claim 24, wherein the instructions further program the processing unit to:

mark one or more loop nodes in a tree of nested loops representing loops in the code, based on at least one of: (i) a type of the loop, (ii) a position of the loop within the tree of nested loops, and (iii) user specification.

39. The system of claim 38, wherein the type of the loop is sequential.

40. The system of claim 38, wherein the position of the loop within the tree of nested loops comprises one of: (i) a loop at tile granularity, and (ii) a loop having a sibling in the tree of nested loops.

41. The system of claim 38, wherein:

the type of the loop is permutable; and a parent of the loop is within a different band; and the parent is unmarked.

42. The system of claim 38, wherein the instructions further program the processing unit to:

construct a tree of EDT structures comprising the EDT structure, each node in the tree of EDT structures representing a different EDT structure corresponding to a respective marked loop node in the tree of nested loops.

43. The system of claim 38, wherein the instructions further program the processing unit to:

construct, by the processor, a tree of nested loops representing loops in the code, each loop node in the tree of nested loops corresponding to a different loop in the code.

44. The system of claim 43, wherein the instructions further program the processing unit to transform loops in the code.

45. The system of claim 43, wherein the instructions further program the processing unit to tile loops in the code.

46. The system of claim 24, wherein the instructions further program the processing unit to:

designate the structure as a parent EDT structure; and extract from the parent EDT structure a child-EDT structure, the child structure being associated with a child loop structure that excludes at least one loop from the loop structure associated with the parent structure, wherein:

the first instance of pair of instances corresponds to the child-EDT structure; and the second instance of the pair of instances corresponds to the child EDT-structure or the parent EDT-structure.

47. An article of manufacture comprising a non-transitory storage medium having stored therein instructions which, when executed by a processor, program the processor as a compiler, for facilitating specification of event-driven tasks (EDTs) for an EDT-based runtime system comprising a plurality of processing units, to:

determine, for an EDT structure corresponding to a loop structure in code to be executed using the EDT-based runtime system, a dependency relation expressing one or more dependencies between a pair of EDT instances, wherein:

a first EDT instance and a second EDT instance in the pair is to be executed using the plurality of processing units of the runtime system, the first EDT instance corresponds to a first node of the EDT structure and the second EDT instance corresponds to a second node of the EDT structure or a node of another different EDT structure, the one or more dependencies cause an operation associated with the second instance to wait for completion of an operation associated with the first instance, the determination of the dependency relation is based on, at least: (i) a type of the loop structure, and (ii) a union of respective individual iteration domains of one or more statements from the loop structure that are associated with the first and second EDT instances, each iteration domain comprising a respective ordered multi-dimensional set of iterations, and the dependency relation enables the runtime system to determine the one or more dependencies between the first and second EDT instances during execution of EDTs associated with the EDT structure, without needing evaluation of dependences via a loop nest resulting from a projection operation and, instead, via the type of the loop structure and the union of the iteration domains.

* * * * *